(12) United States Patent
Yan et al.

(10) Patent No.: US 12,574,825 B2
(45) Date of Patent: Mar. 10, 2026

(54) COMMUNICATION METHOD AND APPARATUS, STORAGE MEDIUM, AND CHIP SYSTEM

(71) Applicant: HUAWEI TECHNOLOGIES CO., LTD., Shenzhen (CN)

(72) Inventors: Zhiji Yan, Shenzhen (CN); Wen Hu, Shanghai (CN); Gong Chen, Shanghai (CN); Chuanzheng Gu, Shanghai (CN); Jiajie Xu, Shanghai (CN)

(73) Assignee: Huawei Technologies Co., LTD.

( * ) Notice: Subject to any disclaimer, the term of this patent is extended or adjusted under 35 U.S.C. 154(b) by 335 days.

(21) Appl. No.: 18/494,331

(22) Filed: Oct. 25, 2023

(65) Prior Publication Data

US 2024/0056943 A1    Feb. 15, 2024

Related U.S. Application Data

(63) Continuation of application No. PCT/CN2021/090070, filed on Apr. 26, 2021.

(51) Int. Cl.
*H04W 40/24*          (2009.01)

(52) U.S. Cl.
CPC ................................. *H04W 40/248* (2013.01)

(58) Field of Classification Search
None
See application file for complete search history.

(56) References Cited

U.S. PATENT DOCUMENTS

| | | | |
|---|---|---|---|
| 10,602,422 B1 | 3/2020 | Jagannatha et al. | |
| 2020/0120487 A1 | 4/2020 | Tang | |
| 2020/0382605 A1 * | 12/2020 | Ouyang | ............... H04W 40/20 |
| 2021/0194970 A1 * | 6/2021 | Li | ........................... H04W 40/00 |
| 2022/0104117 A1 * | 3/2022 | Xu | ...................... H04W 48/18 |
| 2022/0124595 A1 * | 4/2022 | Xu | ...................... H04W 40/248 |
| 2023/0397086 A1 * | 12/2023 | Kim | ...................... H04W 76/11 |

FOREIGN PATENT DOCUMENTS

| | | |
|---|---|---|
| CN | 106664735 A | 5/2017 |
| CN | 109996307 A | 7/2019 |
| CN | 110602761 A | 12/2019 |

(Continued)

OTHER PUBLICATIONS

Ericsson, "Connectivity Models for Edge Computing," 3GPP TSG-SA/WG2 Meeting #136-AH, S2-2000198, Incheon, Korea, Jan. 13-17, 2020, 5 pages.

(Continued)

*Primary Examiner* — Anh Vu H Ly
(74) *Attorney, Agent, or Firm* — Fish & Richardson P.C.

(57) ABSTRACT

A communication method and apparatus, a storage medium, and a chip system are disclosed. In one example, a wireless communication apparatus includes a communication processor and an application processor, and the communication processor is coupled to the application processor. The communication processor is configured to receive a first request sent by the application processor, where the first request is used to query a route selection descriptor. The communication processor is configured to send a second request to a network device. The second request includes at least one parameter in the route selection descriptor.

20 Claims, 8 Drawing Sheets

(56)                References Cited

FOREIGN PATENT DOCUMENTS

| CN | 111182580 | A  | 5/2020  |
|----|-----------|----|---------|
| CN | 111601353 | A  | 8/2020  |
| CN | 111698755 | A  | 9/2020  |
| CN | 112073979 | A  | 12/2020 |
| JP | 2022551790 | A | 12/2022 |
| KR | 20200115155 | A | 10/2020 |
| KR | 20210030167 | A | 3/2021  |
| TW | 202046773 | A  | 12/2020 |
| WO | 2018008944 | A1 | 1/2018  |
| WO | 2019194954 | A1 | 10/2019 |
| WO | 2020112480 | A1 | 6/2020  |
| WO | 2020197288 | A1 | 10/2020 |

OTHER PUBLICATIONS

3GPP TR 28.803 V0.4.0, "3rd Generation Partnership Project; Technical Specification Group Services and System Aspects; Telecommunication management; Study on management aspects of edge computing (Release 16)," Mar. 2019, 18 pages.
3GPP TS 23.501 V15.5.0, "3rd Generation Partnership Project; Technical Specification Group Services and System Aspects; System Architecture for the 5G System; Stage 2 (Release 15)," Mar. 2019, 240 pages.
Huawei et al., "Discussion on SA2 Edge computing study," 3GPP TSG SA2 Meeting #131, S2-1901832, Santa Cruz, Feb. 19, 2019, 13 pages.
Intel, "pCR 28.803 solutions for SMF configuration," 3GPP TSG SA WGS (Telecom Management) Meeting #123, S5-191182, Montreal, Canada, Jan. 21-25, 2019, 2 pages.
International Search Report and Written Opinion in International Appln. No. PCT/CN2021/090070, mailed on Feb. 9, 2022, 15 pages (with English translation).
Office Action in Taiwanese Appln. No. 111115685, mailed on Sep. 14, 2022, 48 pages (with English machine translation).

Extended European Search Report in European Appln No. 21938239. 7, dated Apr. 9, 2024, 8 pages.
3GPP TS 23.503 V17.0.0, "3rd Generation Partnership Project; Technical Specification Group Services and System Aspects; Policy and charging control framework for the 5G System (5GS); Stage 2 (Release 17)," Mar. 2021, 10 pages.
Apple, "Addition of AT commands for PDU Session Context State Change and PDU Session Authentication and Authorization," 3GPP TSG CT WG 1 #128e, C1-211456, Electronic meeting, Feb. 25-Mar. 5, 2021, 19 pages.
Office Action in Japanese Appln. No. 2023-565495, mailed on Oct. 29, 2024, 12 pages (with English translation).
Wikipedia.org [online], "Hayes AT command set," available on or before Nov. 24, 2024, via Internet Archive: Wayback Machine URL. <https://web.archive.org/web/20241124222814/https://en.wikipedia. org/wiki/Hayes_AT_command_set>, retrieved on Jan. 4, 2025, retrieved from URL <https://en.wikipedia.org/wiki/Hayes_AT_command_ set>, 13 pages.
3GPP TS 24.501 V16.5.0, "3rd Generation Partnership Project; Technical Specification Group Core Network and Terminals; Non-Access-Stratum (NAS) protocol for 5G System (5GS); Stage 3; (Release 16)," Jun. 2020, 708 pages.
3GPP TS 24.526 V16.4.0 , "3rd Generation Partnership Project; Technical Specification Group Core Network and Terminals; User Equipment (UE) policies for 5G System (5GS); Stage 3 (Release 16)," Jun. 2020, 52 pages.
3GPP TS 27.007 V17.1.0, "3rd Generation Partnership Project; Technical Specification Group Core Network and Terminals; AT command set for User Equipment (UE) (Release 17)," Mar. 2021, 416 pages.
ETSI TS 123 503 V16.5.1, "5G; Policy and charging control framework for the 5G System (5GS); Stage 2 (3GPP TS 23.503 version 16.5.1 Release 16)," Sep. 2020, 120 pages.
IEEE Std 802.1Q™-2018, "IEEE Standard for Local and Metropolitan Area Network—Bridges and Bridged Networks," May 7, 2018, 1993 pages.

* cited by examiner

Core network
device 30

20

10

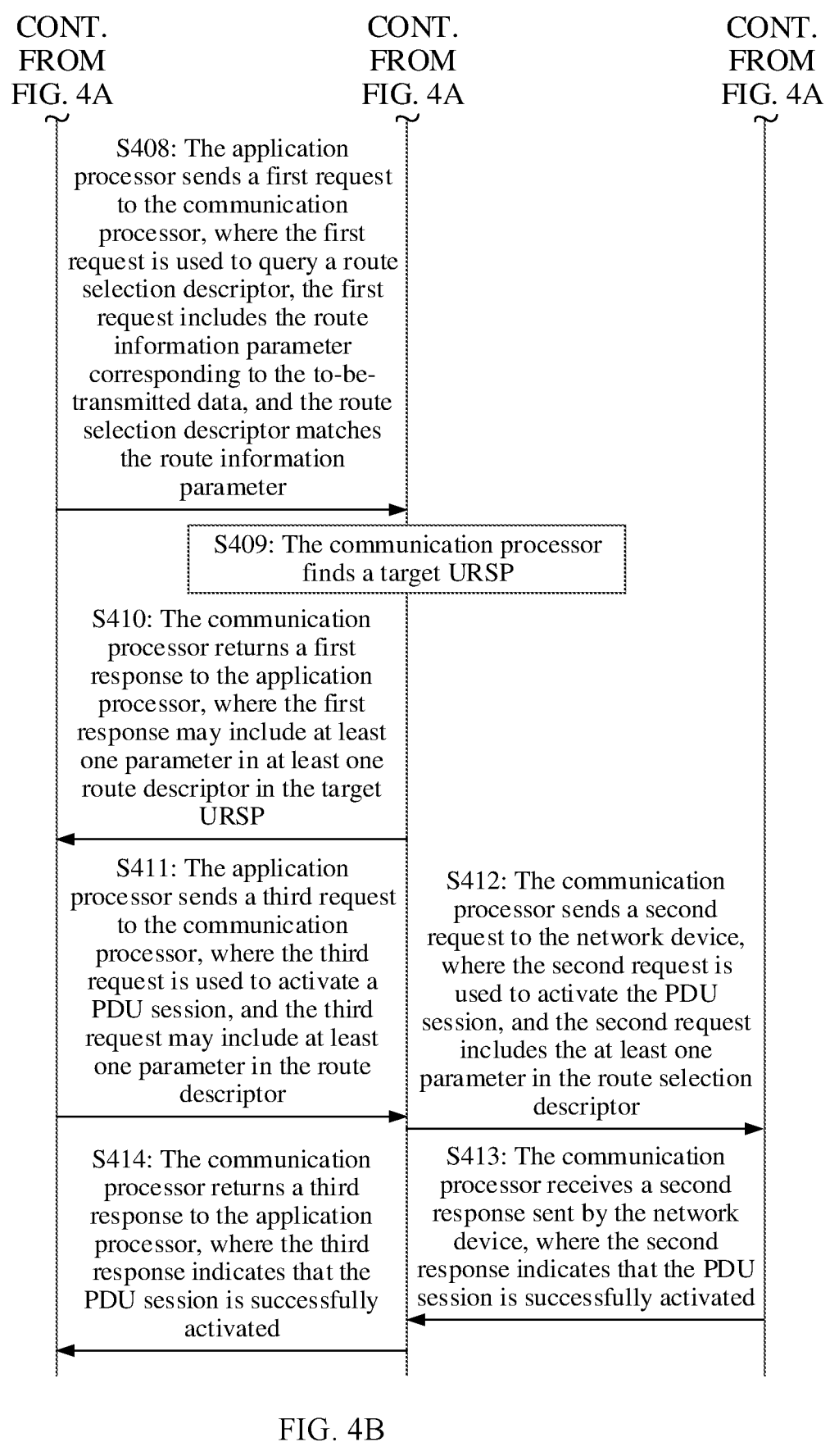

CONT. FROM FIG. 4A     CONT. FROM FIG. 4A     CONT. FROM FIG. 4A

S408: The application processor sends a first request to the communication processor, where the first request is used to query a route selection descriptor, the first request includes the route information parameter corresponding to the to-be-transmitted data, and the route selection descriptor matches the route information parameter S409: The communication processor finds a target URSP S410: The communication processor returns a first response to the application processor, where the first response may include at least one parameter in at least one route descriptor in the target URSP S411: The application processor sends a third request to the communication processor, where the third request is used to activate a PDU session, and the third request may include at least one parameter in the route descriptor S412: The communication processor sends a second request to the network device, where the second request is used to activate the PDU session, and the second request includes the at least one parameter in the route selection descriptor S414: The communication processor returns a third response to the application processor, where the third response indicates that the PDU session is successfully activated S413: The communication processor receives a second response sent by the network device, where the second response indicates that the PDU session is successfully activated

FIG. 4B

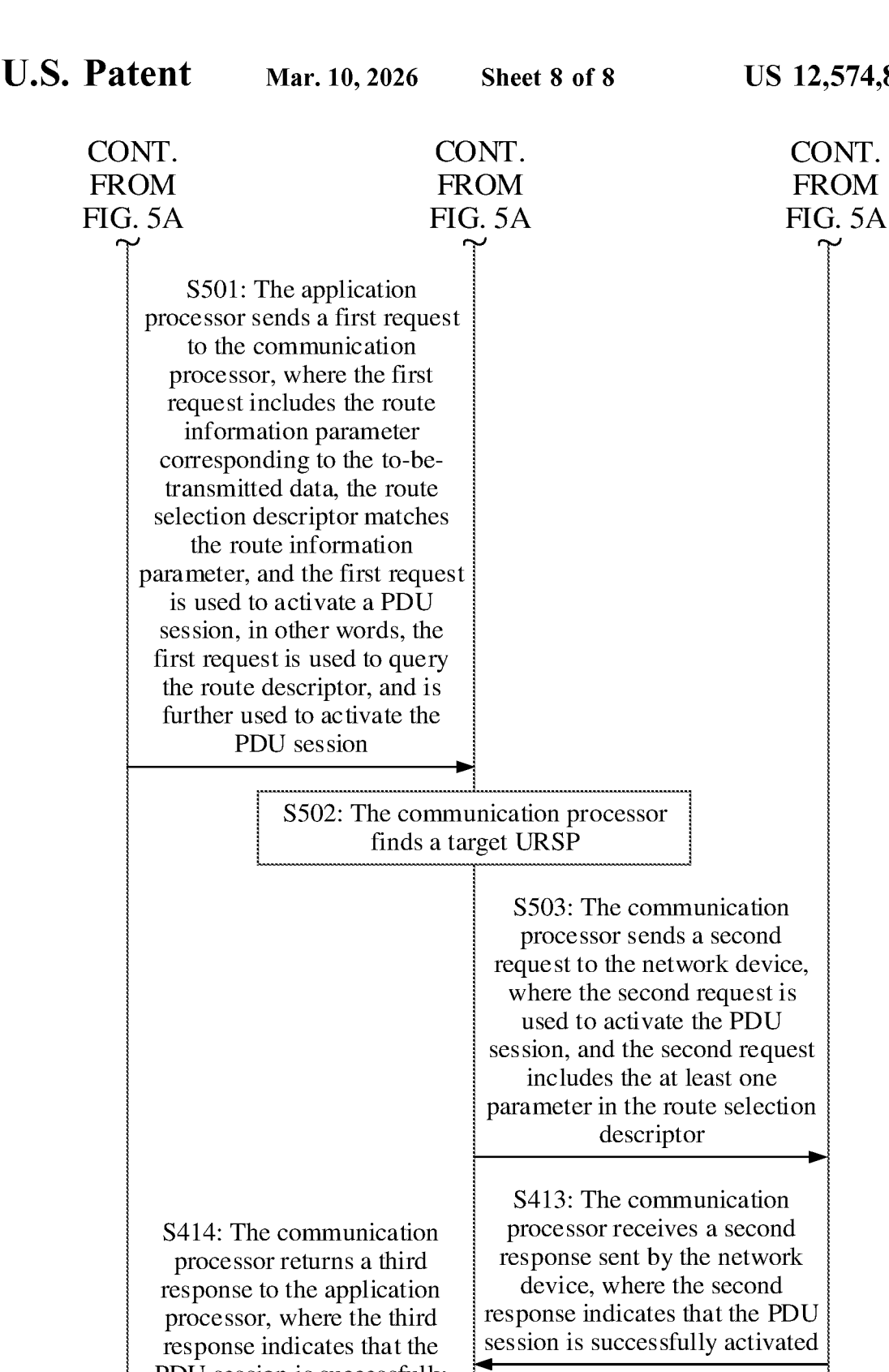

CONT.
FROM
FIG. 5A

CONT.
FROM
FIG. 5A

CONT.
FROM
FIG. 5A

S501: The application processor sends a first request to the communication processor, where the first request includes the route information parameter corresponding to the to-be-transmitted data, the route selection descriptor matches the route information parameter, and the first request is used to activate a PDU session, in other words, the first request is used to query the route descriptor, and is further used to activate the PDU session S502: The communication processor finds a target URSP S503: The communication processor sends a second request to the network device, where the second request is used to activate the PDU session, and the second request includes the at least one parameter in the route selection descriptor S414: The communication processor returns a third response to the application processor, where the third response indicates that the PDU session is successfully activated S413: The communication processor receives a second response sent by the network device, where the second response indicates that the PDU session is successfully activated

FIG. 5B

COMMUNICATION METHOD AND APPARATUS, STORAGE MEDIUM, AND CHIP SYSTEM

CROSS-REFERENCE TO RELATED APPLICATIONS

This application is a continuation of International Application No. PCT/CN2021/090070, filed on Apr. 26, 2021, the disclosure of which is hereby incorporated by reference in its entirety.

TECHNICAL FIELD

This application relates to the field of communication technologies, and in particular, to a communication method and apparatus, a storage medium, and a chip system.

BACKGROUND

The 3rd Generation Partnership Project (3rd generation partnership project, 3GPP) defines a user route selection policy (UE route selection policy, URSP). The URSP is used to determine a route selection descriptor (Route Selection Descriptor, RSD) required by different applications (application, APP) and data packets, such as a network slice (network slice, NS), a data network name (Data Network Name, DNN), and a session and service continuity (session service continuity, SSC) mode. A terminal device may determine a corresponding RSD based on a network requirement of an APP by using the URSP, establish a protocol data unit (protocol data unit, PDU) session based on the determined RSD, and then transmit data of the APP by using the established PDU session.

Currently, a protocol does not specify use of the URSP. Only the 3GPP 27.007 protocol defines two related AT commands. A modem (Modem) reports, by using a +CRUE-POLICY command, information that includes the URSP and that is delivered by a network, for example, user policy information (UE policy section) to an upper-layer system in a form of an original code stream (the upper-layer system usually refers to an operating system or an application control layer). The upper-layer system decodes the original code stream and replies a decoded original code stream to the modem by using a +CSUEPOLICY command. Then, the modem forwards the decoded original code stream to the network.

According to the 3GPP 27.007 protocol, an URSP-related operation tends to be performed in the upper-layer system. However, for some communication apparatus manufacturers such as mobile phone manufacturers, operating systems such as Android (Android) used by the manufacturers are controlled by system publishers, and it is difficult to modify control layer code for a type of feature. If a URSP feature needs to be used on a communication apparatus, each manufacturer needs to develop and maintain the URSP feature by itself, and protocol parsing code in an operating system needs to be synchronously modified with upgrade of a 3GPP protocol. Therefore, development and maintenance costs are high. Based on this, each manufacturer is not willing to implement the URSP on the communication apparatus. For some small communication apparatus manufacturers, such as non-mobile phone manufacturers, many of their products have no operating system and only one application control layer, and basically have no capability of parsing the 3GPP protocol and implementing the URSP feature completely according to the protocol, and it is more difficult to upgrade with the upgrade of the 3GPP protocol. Therefore, currently the URSP feature cannot be implemented on such communication apparatuses.

Based on this, how to improve usage of the URSP feature in a product becomes an urgent problem to be resolved.

SUMMARY

This application provides a communication method and apparatus, a storage medium, and a chip system, to implement a URSP feature by using a communication processor installed in the communication apparatus.

It should be understood that in the solutions provided in embodiments of this application, a communication apparatus may be a wireless communication device, or may be some components in a wireless communication device, for example, an integrated circuit product such as a system chip or a communication chip. The wireless communication device may be a computer device that supports a wireless communication function.

Specifically, the wireless communication device may be a terminal such as a smartphone, or may be a radio access network device such as a base station. The system chip may also be referred to as a system on chip (system on chip, SoC), or briefly referred to as a SoC chip. The communication chip may include a baseband processing chip and a radio frequency processing chip. The baseband processing chip is also sometimes referred to as a modem (modem) or a baseband chip. The radio frequency processing chip is also sometimes referred to as a radio frequency transceiver (transceiver) or a radio frequency chip. In a physical implementation, some or all chips of the communication chip may be integrated into the SoC chip. For example, the baseband processing chip is integrated into the SoC chip, but the radio frequency processing chip is not integrated into the SoC chip.

According to a first aspect, a wireless communication apparatus is provided, including a communication processor. The communication processor includes a processing circuit and an interface circuit coupled to the processing circuit. The processing circuit is configured to: receive, through the interface circuit, a first request sent by an application processor; and send, through the interface circuit, a second request to a network device. The first request is used to query a route selection descriptor. The first request includes a route information parameter corresponding to to-be-transmitted data. The second request is used to activate a session. The second request includes at least one parameter in the route selection descriptor. The route selection descriptor matches the route information parameter. It can be learned that the communication processor may trigger, based on the first request, an operation of querying the route selection descriptor, and then requests, based on the found route selection descriptor that matches the route information parameter, establishment of the session from the network device. In this way, a URSP feature is implemented on the wireless communication apparatus. In addition, this solution does not require other vendors to develop and maintain the URSP feature at an operating system layer, thereby reducing costs of the vendors. In addition, for a wireless communication apparatus that has no operating system, or whose operating system does not have a capability of performing decoding based on an original code stream corresponding to a URSP rule, the URSP feature may alternatively be implemented by using an installed communication processor. In this way, usage of the URSP feature in a product can be improved.

In a possible implementation, the route information parameter is the same as a parameter included in a traffic descriptor in a target URSP rule. The route selection descriptor is a route selection descriptor in the target URSP rule. The route information parameter is matched with the traffic descriptor in the target URSP rule, to find the target URSP rule, and then obtain the routing selection descriptor that matches the route information parameter. In this way, the route information parameter can be more compatible with the URSP feature in the standard.

In a possible implementation, the route information parameter includes at least one of the following parameters: a destination address parameter of to-be-transmitted data; a data network parameter corresponding to the to-be-transmitted data; an application descriptor corresponding to the to-be-transmitted data; or a connection capability parameter corresponding to the to-be-transmitted data. Because the route selection descriptor can be queried based on a plurality of types of parameters, flexibility of the solution can be improved.

In a possible implementation, the traffic descriptor includes at least one of the following parameters: a destination address parameter; a data network parameter; an application descriptor; or a connection capability parameter. The parameter type in the traffic descriptor is basically the same as the parameter type in the route information parameter. Therefore, the required route selection descriptor is found by matching the two parameters.

In a possible implementation, the destination address parameter includes at least one of the following parameters: a domain descriptor corresponding to the to-be-transmitted data; an internet protocol IP descriptor corresponding to the to-be-transmitted data; or a non-IP descriptor corresponding to the to-be-transmitted data. Because there are a plurality of types of destination address parameters, flexibility of the solution can be improved.

In a possible implementation, the data network parameter includes a DNN. In this way, a data network required by the to-be-transmitted data may be determined based on the DNN.

In a possible implementation, a parameter in the route selection descriptor includes a parameter that the session needs to meet. The parameter that the session needs to meet includes at least one of the following content: a parameter of a network required by the session; a parameter of a network slice required by the session; or a parameter of a session service required by the session. Because there are a large quantity of parameter types in the route selection descriptor, session creation requirements can be met from a plurality of perspectives, and more personalized services can be provided for a user.

In a possible implementation, the parameter of the network includes at least one of the following parameters: a session type, the data network name DNN, an access type preference, or a non-seamless offload indication. Because there are a large quantity of types of parameters of the network, flexibility of the solution can be improved, and more personalized services can be provided for the user.

In a possible implementation, the parameter of the network slice includes at least one of the following parameters: a network slice type or a network slice name. In this way, the network slice parameter required by the session may be determined based on the network slice type or name.

In a possible implementation, the parameter of the session service includes a session and service continuity SSC parameter. A session-based service parameter can provide a user with a service mode suitable for a session feature.

In a possible implementation, the first request is further used to activate the session. In this way, the first request may include two functions, querying the route selection descriptor and activating the session. The communication processor may then perform two actions based on the first request: querying the route selection descriptor and activating the session. It can be learned that in this solution, there is almost no change to the application processor, and only the first request needs to be sent. The URSP feature is implemented by the communication processor, which can reduce a workload of various vendors to modify an operating system.

In a possible implementation, the first request includes at least one of the following content: +CACT; +CPSDIAL; +CACT; +CEST; or +CCONN. In this way, a function of the first request may be implemented by using a newly defined AT command, to be more compatible with the conventional technology. In addition, "ACT" in this command includes a meaning of activating the session, which is more practical and easier for the user to understand the meaning of this command.

In a possible implementation, the processing circuit is further configured to return, through the interface circuit, a first response to the application processor after receiving the first request sent by the application processor and before sending the second request to the network device, where the first response includes the at least one parameter in the route selection descriptor. In this way, the communication processor may return the at least one parameter in the found route selection descriptor to the application processor, so that the application processor uses the parameter as a dialing parameter when activating the session, thereby implementing the URSP feature.

In a possible implementation, the first request includes at least one of the following content: +C5GRSDQRY; +C5GURSPQRY, +CURSPQRY, +CQRSD; +C5GQRSD; or +C5GRURSP. In this way, a query function of the first request may be implemented by using the newly defined AT command, to be more compatible with the conventional technology. In addition, "5GRSDQRY" in this command is used by including "5GRSDQRY" in a 5G network and a function is a meaning of querying the route selection descriptor, which is more practical and easy for the user to understand.

In a possible implementation, the first response further includes a preference of the route selection descriptor. In this way, the application processor may sequentially select and perform dialing based on precedences of various route selection descriptors, to create the session.

In a possible implementation, after returning the first response and before sending the second request to the network device, the communication processor is further configured to: receive a third request sent by the application processor, where the third request is used to activate the session, and the third request includes the at least one parameter in the route selection descriptor. In this implementation, the third request may carry the route selection descriptor queried from the communication processor. Therefore, the route selection descriptor can be selected by the application processor. In addition, because the solution is added to implement the URSP feature, diversity of this embodiment of this application can be improved, and more alternative implementation solutions can be provided for the user, thereby improving flexibility.

In a possible implementation, the second request is a session establishment request. The second request sent by the communication processor may be a session establishment request defined in an existing protocol. A 5G technology is used as an example. The second request may be a PDU session establishment request, and carries the at least one parameter in the route selection descriptor as a dialing parameter. In this way, the route selection descriptor can be more compatible with the existing protocol.

In a possible implementation, the processing circuit is further configured to: receive, through the interface circuit, at least one URSP rule that is delivered by the network device and that corresponds to the wireless communication apparatus, where a URSP rule in the at least one URSP rule includes a traffic descriptor and at least one route selection descriptor; and send, through the interface circuit, a first message to the application processor, where the first message includes a parameter in at least one traffic descriptor in the at least one URSP rule. In this way, decoding of the original code stream of the URPS rule may be migrated to the communication processor for implementation, thereby reducing a requirement for the application processor. In addition, sending the traffic descriptor to the application processor may provide a basis for the application processor to perform preliminary filtering.

In a possible implementation, the first message includes at least one of the following content: +C5GTDRPT; +CT-DRPT; +CURSPRPT; or +C5GTD. In this way, the query function of the first request may be implemented by using the newly defined AT command, to be more compatible with the conventional technology. In addition, the command may include a meaning of returning the traffic descriptor, which is more practical and easier for the user to understand the meaning of the command.

In a possible implementation, the wireless communication apparatus further includes the application processor, and the communication processor is coupled to the application processor. The application processor is specifically configured to determine whether a traffic descriptor meeting a preset condition exists in the at least one received traffic descriptor, where the preset condition includes: a parameter in the traffic descriptor matches the route information parameter. If the traffic descriptor meeting the preset condition exists, the first request is sent. In this way, because the application processor may perform preliminary screening, the application processor may send the first request after determining that the traffic descriptor corresponding to the route information parameter exists in the URSP rule delivered by the network. In another possible implementation, if it is found that the traffic descriptor matching the route information parameter does not exist in the URSP rule delivered by the network, an original solution may be used. To be specific, after receiving a PDU session activation request, the communication processor does not query the route selection descriptor, but directly initiates the PDU session to the network. However, the parameter in the route selection descriptor is no longer used as a dialing parameter in the PDU session. In still another possible implementation, if the traffic descriptor matching the route information parameter does not exist in the URSP rule delivered by the network, it may be determined that the session is activated unsuccessfully.

In a possible implementation, the processing circuit is further configured to: after sending the second request to the network device, receive, through the interface circuit, a second response, where the second response indicates that the session is activated successfully; and return a third response to the application processor, where the third response indicates that the session is activated successfully. After receiving a message indicating that the session is activated successfully, the communication processor indicates, to the application processor, that the session is activated successfully, and may send a session message, so that the application processor transmits data based on the activated session.

In another possible implementation, the processing circuit is further configured to: if a message indicating that the session is activated unsuccessfully is received through the interface circuit, the communication processor may automatically select a route selection descriptor with a second preference to continue to initiate a session activation procedure until the session is activated successfully, or all matched route selection descriptors are used up. In this manner, the communication processor may select to feed back the message indicating that the session is activated unsuccessfully to the application processor, or may not feed back the message indicating that the session is activated unsuccessfully.

In still another possible implementation, the processing circuit is further configured to return, through the interface circuit, a message indicating that the session is activated unsuccessfully to the application processor, so that the application processor selects a route selection descriptor with a second preference to continue to initiate a session activation procedure until the session is activated successfully, or all the matched route selection descriptors are used up.

In a possible implementation, the processing circuit is configured to: receive, through the interface circuit, an original code stream that corresponds to the at least one URSP rule corresponding to the wireless communication apparatus and that is delivered by the network device; decode the original code stream corresponding to the URSP rule, to obtain the at least one URSP rule; and store the at least one URSP rule into a memory. In this way, decoding of the original code stream of the URPS rule may be migrated to the communication processor for implementation, thereby reducing the requirement for the application processor.

In a possible implementation, the application processor is not capable of performing decoding based on the original code stream corresponding to the URSP rule. In this way, decoding of the original code stream of the URPS rule may be migrated to the communication processor for implementation, thereby reducing the requirement for the application processor. This provides a basis for popularizing the URSP feature in a wireless communication device whose application processor has a weak capability.

According to a second aspect, an embodiment of this application provides a communication method, applicable to a wireless communication apparatus including a communication processor. The method includes: receiving, through the communication processor, a first request sent by an application processor; and sending, through the communication processor, a second request to a network device. The first request is used to query a route selection descriptor, and the first request includes a route information parameter corresponding to to-be-transmitted data. The second request is used to activate a session, and the second request includes at least one parameter in the route selection descriptor. The route selection descriptor matches the route information parameter. It can be learned that the communication processor may trigger, based on the first request, an operation of querying the route selection descriptor, and then requests, based on the found route selection descriptor that matches the route information parameter, establishment of the session from a network. In this way, a URSP feature is implemented on the wireless communication apparatus. In addition, this solution does not require other vendors to develop and maintain the URSP feature at an operating system layer, thereby reducing costs of the vendors. In addition, for a wireless communication apparatus that has no operating system, or whose operating system does not have a capability of performing decoding based on an original code stream corresponding to a URSP rule, the URSP feature may alternatively be implemented by using an installed communication processor. In this way, usage of the URSP feature in a product can be improved.

In a possible implementation, the route information parameter is the same as a parameter included in a traffic descriptor in a target URSP rule. The route selection descriptor is a route selection descriptor in the target URSP rule. The route information parameter is matched with the traffic descriptor in the URSP rule, to find the target URSP rule, and then obtain the routing selection descriptor that matches the route information parameter. In this way, the route information parameter can be more compatible with the URSP feature in the standard.

In a possible implementation, the route information parameter includes at least one of the following parameters: a destination address parameter of to-be-transmitted data; a data network parameter corresponding to the to-be-transmitted data; an application descriptor corresponding to the to-be-transmitted data; or a connection capability parameter corresponding to the to-be-transmitted data. Because the route selection descriptor can be queried based on a plurality of types of parameters, flexibility of the solution can be improved.

In a possible implementation, the traffic descriptor includes at least one of the following parameters: a destination address parameter; a data network parameter; an application descriptor; or a connection capability parameter. The parameter type in the traffic descriptor is basically the same as the parameter type in the route information parameter. Therefore, the required route selection descriptor is found by matching the two parameters.

In a possible implementation, the destination address parameter includes at least one of the following parameters: a domain descriptor corresponding to the to-be-transmitted data; an internet protocol IP descriptor corresponding to the to-be-transmitted data; or a non-IP descriptor corresponding to the to-be-transmitted data. Because there are a plurality of types of destination address parameters, flexibility of the solution can be improved.

In a possible implementation, the data network parameter includes a DNN. In this way, a data network required by the to-be-transmitted data may be determined based on the DNN.

In a possible implementation, a parameter in the route selection descriptor includes a parameter that the session needs to meet. The parameter that the session needs to meet includes at least one of the following content: a parameter of a network required by the session; a parameter of a network slice required by the session; or a parameter of a session service required by the session. Because there are a large quantity of parameter types in the route selection descriptor, session creation requirements can be met from a plurality of perspectives, and more personalized services can be provided for a user.

In a possible implementation, the parameter of the network includes at least one of the following parameters: a session type, the data network name DNN, an access type preference, or a non-seamless offload indication. Because there are a large quantity of types of parameters of the network, flexibility of the solution can be improved, and more personalized services can be provided for the user.

In a possible implementation, the parameter of the network slice includes at least one of the following parameters: a network slice type or a network slice name. In this way, the network slice parameter required by the session may be determined based on the network slice type or name.

In a possible implementation, the parameter of the session service includes a session and service continuity SSC parameter. A session-based service parameter can provide a user with a service mode suitable for a session feature.

In a possible implementation, the first request is further used to activate the session. In this way, the first request may include two functions, querying the route selection descriptor and activating the session. The communication processor may then perform two actions based on the first request: querying the route selection descriptor and activating the session. It can be learned that in this solution, there is almost no change to the application processor, and only the first request needs to be sent. The URSP feature is implemented by the communication processor, which can reduce a workload of various vendors to modify an operating system.

In a possible implementation, after receiving the first request sent by the application processor and before sending the second request to the network device, the communication processor further returns a first response to the application processor, where the first response includes the at least one parameter in the route selection descriptor. In this way, the communication processor may return the at least one parameter in the found route selection descriptor to the application processor, so that the application processor uses the parameter as a dialing parameter when activating the session, thereby implementing the URSP feature.

In a possible implementation, the first response further includes a preference of the route selection descriptor. In this way, the application processor may sequentially select and perform dialing based on precedences of various route selection descriptors, to create the session.

In a possible implementation, after the returning a first response through the communication processor and before sending a second request to a network device, the method further includes: receiving a third request sent by the application processor through the communication processor, where the third request is used to activate the session, and the third request includes the at least one parameter in the route selection descriptor. In this implementation, the third request may carry the route selection descriptor queried from the communication processor. Therefore, the route selection descriptor can be selected by the application processor. In addition, because the solution is added to implement the URSP feature, diversity of this embodiment of this application can be improved, and more alternative implementation solutions can be provided for the user, thereby improving flexibility.

In a possible implementation, the second request is a session establishment request, and the second request includes the at least one parameter in the route selection descriptor. The second request sent by the communication processor may be a session establishment request defined in an existing protocol. A 5G technology is used as an example. The second request may be a PDU session establishment request, and carries the at least one parameter in the route selection descriptor as a dialing parameter. In this way, the route selection descriptor can be more compatible with the existing protocol.

In a possible implementation, before the receiving a first request sent by an application processor through the communication processor, the method further includes: receiving, through the communication processor, at least one URSP rule that is delivered by the network device and that corresponds to the wireless communication apparatus, where a URSP rule in the at least one URSP rule includes a traffic descriptor and at least one route selection descriptor; and sending, through the communication processor, a first message to the application processor, where the first message includes a parameter in at least one traffic descriptor in the at least one URSP rule. In this way, decoding of the original code stream of the URPS rule may be migrated to the communication processor for implementation, thereby reducing the requirement for the application processor. In addition, sending the traffic descriptor to the application processor may provide a basis for the application processor to perform preliminary filtering.

In a possible implementation, after the sending a first message to the application processor, the method further includes: determining, through the application processor, whether a traffic descriptor meeting a preset condition exists in the received at least one traffic descriptor, where the preset condition includes: a parameter in the traffic descriptor matches the route information parameter; and if the traffic descriptor meeting the preset condition exists, sending the first request. In this way, because the application processor may perform preliminary screening, the application processor may send the first request after determining that the traffic descriptor corresponding to the route information parameter exists in the URSP rule delivered by the network. In another possible implementation, if it is found that the traffic descriptor matching the route information parameter does not exist in the URSP rule delivered by the network, an original solution may be used. To be specific, after receiving a session activation request, the communication processor does not query the route selection descriptor, but directly initiates the session to the network. However, the parameter in the route selection descriptor is no longer used as a dialing parameter in the session. In still another possible implementation, if the traffic descriptor matching the route information parameter does not exist in the URSP rule delivered by the network, it may be determined that the session is activated unsuccessfully.

In a possible implementation, after sending the second request to the network device through the communication processor, the communication processor further receives a second response, and returns a third response to the application processor. The second response indicates that the session is activated successfully. The third response indicates that the session is activated successfully. After receiving the message indicating that the session is activated successfully, the communication processor indicates to the application processor that the session is activated successfully, and may send a session message, so that the application processor transmits data based on the activated session.

In another possible implementation, if a message indicating that the session is activated unsuccessfully is received, the communication processor may select a route selection descriptor with a second preference to continue to initiate a session activation procedure by itself until the session is activated successfully, or all matched route selection descriptors are used up. In this manner, the communication processor may select to feed back the message indicating that the session is activated unsuccessfully to the application processor, or may not feed back the message.

In still another possible implementation, the communication processor may return a message indicating that the session is activated unsuccessfully to the application processor, and the application processor selects a route selection descriptor with a second highest preference to continue to initiate a session activation procedure until the session is activated successfully, or all matched route selection descriptors are used up.

In a possible implementation, before receiving, through the communication processor, the first request sent by the application processor, the communication processor receives, through the communication processor, an original code stream that corresponds to the at least one URSP rule corresponding to the wireless communication apparatus and that is delivered by the network device; and decode the original code stream corresponding to the URSP rule to obtain the at least one URSP rule; and stores the at least one URSP rule in a memory. In this way, decoding of the original code stream of the URPS rule may be migrated to the communication processor for implementation, thereby reducing the requirement for the application processor.

In a possible implementation, the application processor is not capable of performing decoding based on the original code stream corresponding to the URSP rule. In this way, decoding of the original code stream of the URPS rule may be migrated to the communication processor for implementation, thereby reducing the requirement for the application processor. This provides a basis for popularizing the URSP feature in a wireless communication device whose application processor has a weak capability.

This application further provides a communication apparatus, including a processor and a memory. The memory is configured to store program instructions. The processor is configured to execute the program instructions stored in the memory, to implement any possible method in the second aspect.

This application further provides a communication apparatus, including a processor and an interface circuit. The interface circuit is configured to access a memory, and the memory stores program instructions. The processor is configured to access the memory through the interface circuit, and execute the program instructions stored in the memory, to implement any possible method in the second aspect.

This application provides a computer-readable storage medium. The computer-readable storage medium stores computer-readable instructions. When a computer reads and executes the computer-readable instructions, computer is enabled to perform the method in any one of the foregoing possible designs.

This application provides a computer program product. When a computer reads and executes the computer program product, computer is enabled to perform the method in any one of the foregoing possible designs.

This application provides a chip. The chip is connected to a memory, and is configured to read and execute a software program stored in the memory, to implement the method in any one of the foregoing possible designs.

BRIEF DESCRIPTION OF DRAWINGS

FIG. 4A and FIG. 4B are a schematic flowchart of a possible communication method according to an embodiment of this application; and FIG. 5A and FIG. 5B are a schematic flowchart of another possible communication method according to an embodiment of this application.

DESCRIPTION OF EMBODIMENTS

The following describes embodiments of this application with reference to accompanying drawings.

Technical solutions in embodiments of this application may be applied to various communication systems, for example, a long term evolution (Long Term Evolution, LTE) system, an LTE frequency division duplex (Frequency Division Duplex, FDD) system, LTE time division duplex (Time Division Duplex, TDD), a fifth generation (5th Generation, 5G) system, new radio (New Radio, NR), a future sixth generation (6th Generation, 6G) system, and the like. This is not limited herein.

Figure 1:
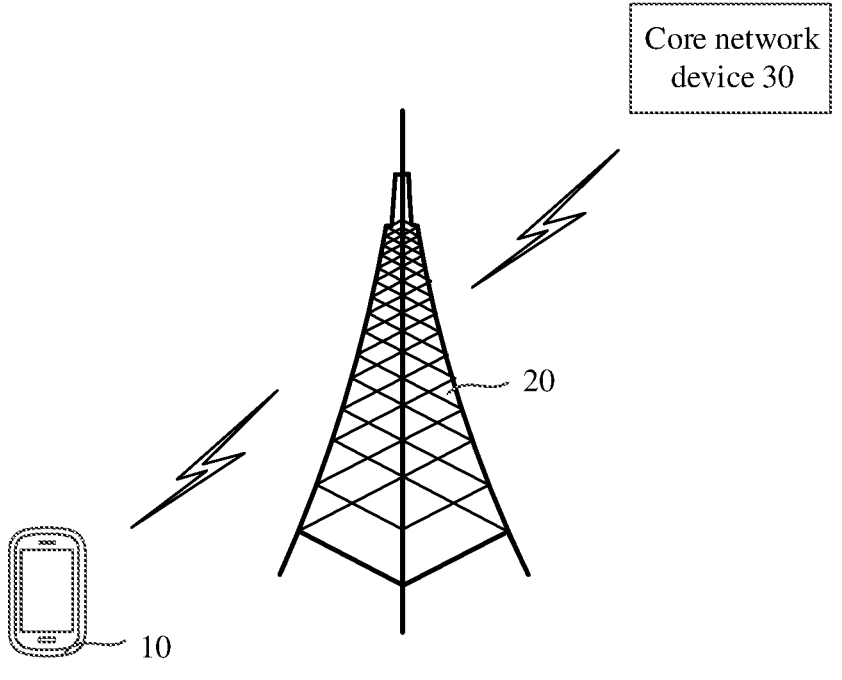
FIG. 1 is a schematic diagram of an architecture of a communication system to which an embodiment of this application is applicable.

FIG. 1 is a schematic diagram of an architecture of an example of a communication system to which an embodiment of this application is applicable. As shown in FIG. 1, the communication system includes a terminal device 10 and a network device. The network device is typically owned by a carrier or an infrastructure provider, and is operated or maintained by these vendors. The network device may be further divided into a (radio) access network (radio access network, (R)AN) device 20 and a core network (core network, CN) device 30. The RAN device includes a base station (base station, BS), a small cell, a 5G router, or the like.

It should be understood that in solutions provided in embodiments of this application, the wireless communication apparatus may be a wireless communication device, or may be some components in a wireless communication device, for example, an integrated circuit product such as a system chip or a communication chip. The wireless communication device may be a computer device that supports a wireless communication function.

Specifically, the wireless communication device may be the terminal device 10 (for example, a terminal such as a smartphone), or may be the (R)AN device 20 (for example, a (R)AN device such as a base station). The system chip may also be referred to as a system on chip (system on chip, SoC), or briefly referred to as a SoC chip. The communication chip may include a baseband processing chip and a radio frequency processing chip. The baseband processing chip is also sometimes referred to as a modem (modem) or a baseband chip. The radio frequency processing chip is also sometimes referred to as a radio frequency transceiver (transceiver) or a radio frequency chip. In a physical implementation, some or all chips of the communication chip may be integrated into the SoC chip. For example, the baseband processing chip is integrated into the SoC chip, but the radio frequency processing chip is not integrated into the SoC chip.

The following describes devices related to embodiments of this application with reference to FIG. 1.

(1) Terminal Device 10

The terminal device 10 may also be referred to as a terminal (terminal). The terminal can establish a connection to the network device, and provide a specific wireless communication service for a user based on a service of the network device. It should be understood that, because the terminal has a closer relationship with the user, the terminal is also sometimes referred to as user equipment (user equipment, UE) or a subscriber unit (subscriber unit, SU). In addition, compared with a base station that is usually placed at a fixed location, the terminal usually moves along with the user, and is also sometimes referred to as a mobile station (mobile station, MS). In addition, some network devices such as a relay node (relay node, RN) or a wireless router may also sometimes be considered as terminals because the network devices have a UE identity or belong to the user.

Specifically, the terminal may be a mobile phone (mobile phone), a tablet computer (tablet computer), a laptop computer (laptop computer), a wearable device (for example, a smartwatch, a smart band, a smart helmet, or smart glasses), other devices that have a wireless access capability, for example, an intelligent vehicle, various internet of things (internet of things, IOTs) devices including various smart home devices (such as a smart meter and a smart home appliance) and smart city devices (such as a security or monitoring device and an intelligent road transportation facility), and the like.

(2) (R)AN Device 20

It should be understood that the (R)AN device 20 is configured to provide a network access function for an authorized terminal device in a specific area, and can use transmission tunnels of different quality based on a level of the terminal device, a service requirement, and the like. The (R)AN device 20 can manage radio resources, provide an access service for a terminal device, and further complete forwarding of a control signal and terminal device data between the terminal device and a core network. The access network device may include various forms of base stations, such as a macro base station, a micro base station (also referred to as a small cell), a relay station, and an access point.

The base station may also sometimes be referred to as a wireless access point (access point, AP) or a transmission reception point (transmission reception point, TRP). Specifically, the base station may be a universal NodeB (generation NodeB, gNB) in a 5G new radio (new radio, NR) system or an evolved NodeB (evolved NodeB, eNB) in a 4G long term evolution (long term evolution, LTE) system. Base stations may be classified into a macro base station (macro base station) or a micro base station (micro base station) based on different physical forms or transmit powers of the base stations. The micro base station is also sometimes referred to as a small base station or a small cell (small cell).

In different communication systems, the (R)AN device 20 may be specifically different.

For example, a 5G access network device may be a next-generation NodeB (next generation NodeB, gNB). The gNB may be connected to a terminal device, and the gNB and the terminal device communicate with each other by using a new radio (new radio, NR) access technology. That is, the gNB communicates with the terminal device through an NR link.

A 4G access network device may be an evolved NodeB (evolved NodeB, eNB). The terminal device may be located in a signal coverage area of the 4G access network device. The terminal device may be connected to the 4G access network device, and communicate with the 4G access network device through an LTE link.

A 2G access network device may be a base transceiver station (base transceiver station, BTS) or a base station controller (base station controller, BSC). A 3G access network device may be a NodeB (NodeB), or referred to as a base station or a radio network controller (radio network controller, RNC).

(3) Core Network (Core Network, CN) Device 30

A core network device is configured to provide a user connection and perform user management and service carrying. For example, establishment of the user connection includes functions such as mobility management (mobile management, MN) and paging (paging). User management includes user description, QoS, and security (corresponding security measures provided by an authentication center include security management of a mobile service and security processing on external network access). A bearer connection includes a public switched telephone network (public switched telephone network, PSTN) connected to the external, an external circuit data network, an external packet data network, internet (Internet), and the like.

In different communication systems, the core network device 30 may be specifically different.

For example, a core network device in the 5G communication system may also be referred to as a 5G core network (5G core network, 5GC). A network element in the 5GC is a functional virtual unit, and may include but is not limited to a unit used for an access and mobility management function (access and mobility management function, AMF), a unit used for a session management function (session management function, SMF), a network element used for unified data management (unified data management, UDM), or the like.

A core network device in a 4G communication system may also be referred to as an evolved packet system (evolved packet core, EPC). The EPC mainly includes the following network elements: a mobility management entity (mobility management entity, MME), a serving gateway (serving gateway, SGW), a packet data network gateway (packet data network gateway, PGW), a home subscriber server (home subscriber server, HSS), an application server, and the like. Main functions of the MME include access control, mobility management, attach and detach, session management (for example, bearer establishment, modification, and release), and the like. The SGW is mainly configured to route and forward a data packet. Main functions of the PGW include a user-based packet filtering function, a lawful interception function, an IP address allocation function, and the like. The HSS is configured to store user subscription information, user subscription data, location information of a mobile user, and the like.

A 2G/3G core network device may be a mobile switching center (Mobile Switching Center, MSC), a base station controller (base station controller, BSC), or the like.

Figure 2A:
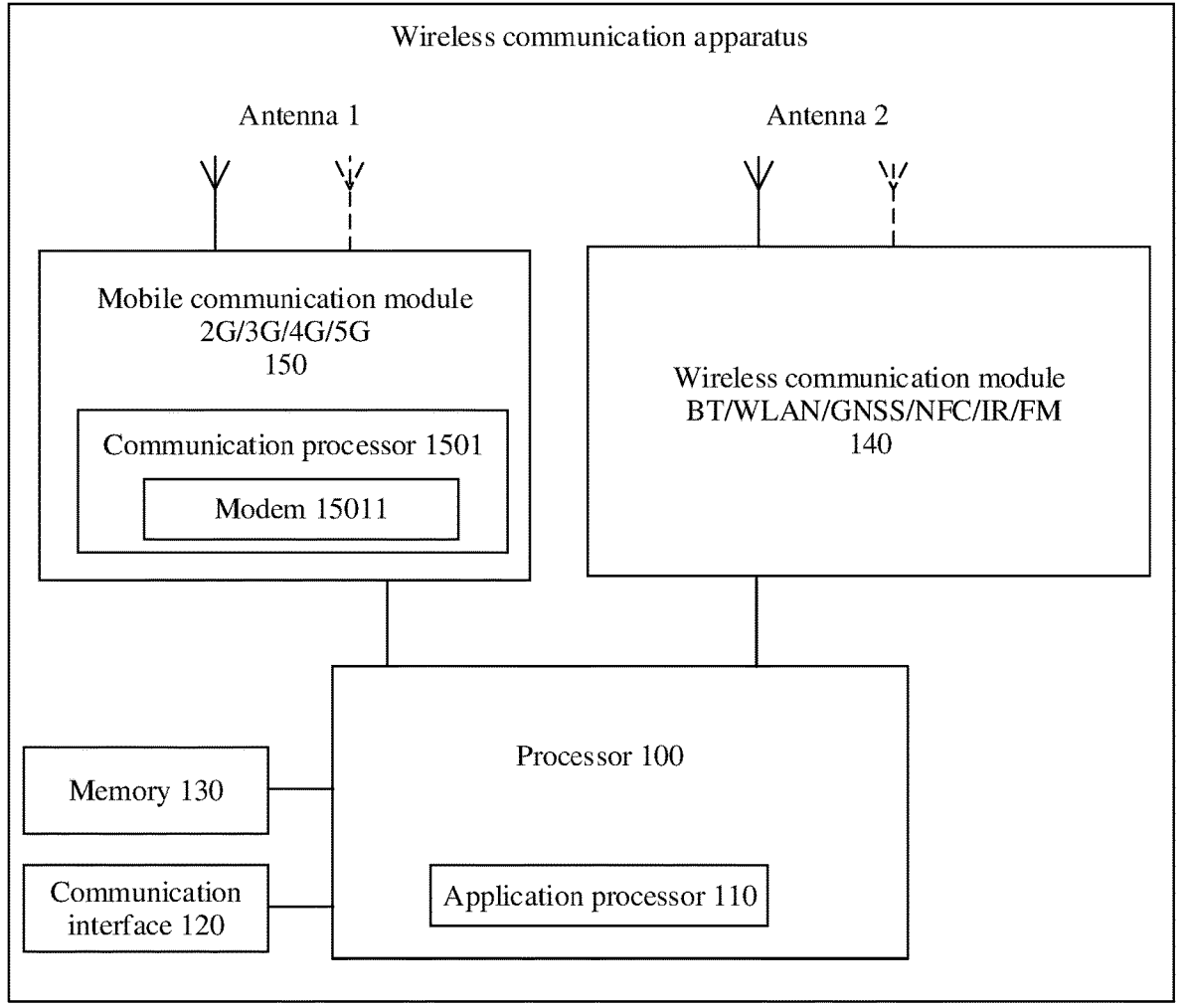
FIG. 2*a* is a schematic diagram of a structure of a wireless communication apparatus according to an embodiment of this application.

FIG. 2a is an example of a schematic diagram of a structure of a wireless communication apparatus according to an embodiment of this application.

As shown in FIG. 2a, the wireless communication apparatus may include a processor 100. The processor 100 in this embodiment of this application may include an application processor 110 and a communication processor 1501. The communication processor 1501 may be a modem 15011. The wireless communication apparatus may further include a communication interface 120, a memory 130, an antenna 1, an antenna 2 (the antenna 1 and the antenna 2 are used as an example in FIG. 2a, and optionally, another antenna may be further included), a mobile communication module 150, a wireless communication module 140, and the like. The communication processor 1501 may be disposed in the mobile communication module 150, or may be disposed in another location. For example, the communication processor 1501 and the application processor 110 may be disposed on a same chip. In the figure, an example in which the communication processor 1501 is located in the mobile communication module 150 is used.

The following describes the components of the wireless communication apparatus in detail with reference to FIG. 2a.

(1) Processor 100

The processor 100 in this embodiment of this application may include one or more processing units. For example, the processor 100 may include the application processor (application processor, AP) 110, the communication processor 1501 (for example, the modem 15011), a graphics processing unit (graphics processing unit, GPU), an image signal processor (image signal processor, ISP), a controller, a memory, a video codec, a digital signal processor (digital signal processor, DSP), a baseband processor, and/or a neural-network processing unit (neural-network processing unit, NPU). Different processing units may be independent components, or may be integrated into one or more processors. The controller may be a nerve center and a command center of the terminal device. The controller may generate an operation control signal based on an instruction operation code and a time sequence signal, to complete control of instruction reading and instruction execution. In FIG. 1, an example in which the communication processor 1501 is deployed in the mobile communication module 150 is used for illustration. In specific implementation, the communication processor 1501 may alternatively be deployed in the processor 100.

(2) Mobile Communication Module 150

A wireless communication function of the terminal device may be implemented by using the antenna 1, the antenna 2, the mobile communication module 150, the wireless communication module 140, the communication processor 1501 (for example, the modem 15011), a baseband processor, and the like.

The antenna 1 and the antenna 2 are configured to transmit and receive an electromagnetic wave signal. Each antenna in the terminal device may be configured to cover one or more communication frequency bands. Different antennas may be further multiplexed, to improve antenna utilization. For example, the antenna 1 may be multiplexed as a diversity antenna of a wireless local area network. In some other embodiments, the antenna may be used in combination with a tuning switch.

The mobile communication module 150 may provide a wireless communication solution used in the terminal device and including wireless communication of 2G, 3G, 4G, 5G, and the like. The mobile communication module 150 may include at least one filter, a switch, a power amplifier, a low noise amplifier (low noise amplifier, LNA), and the like. The mobile communication module 150 may receive an electromagnetic wave through the antenna 1, perform processing such as filtering or amplification on the received electromagnetic wave, and transmit the electromagnetic wave to the communication processor 1501 for demodulation. The mobile communication module 150 may further amplify a signal modulated by the communication processor 1501, and convert the signal into an electromagnetic wave for radiation through the antenna 1. In some embodiments, at least some functional modules (for example, the communication processor 1501) of the mobile communication module 150 may be disposed in the processor. In some embodiments, at least some functional modules of the mobile communication module 150 and at least some modules of the processor may be disposed in a same component.

(3) Communication Processor 1501

The communication processor 1501 is, for example, the modem 15011. The modem 15011 is short for a modulator (modulator) and a demodulator (demodulator), and is referred to as a modem in Chinese. According to a harmonic tone of the modem, the modem 15011 is nicknamed "cat", and is an electronic device that can implement modulation and demodulation functions required for communication. The modem 15011 typically includes the modulator and the demodulator. The modulator is configured to modulate a to-be-sent low-frequency baseband signal into a medium-high frequency signal. The demodulator is configured to demodulate a received electromagnetic wave signal into a low-frequency baseband signal. Then, the demodulator transmits the low-frequency baseband signal obtained through demodulation to the baseband processor for processing. The low frequency baseband signal is processed by the baseband processor and then transmitted to the application processor 110. In some embodiments, the modem 15011 may be an independent component. In some other embodiments, the modem 15011 may be independent of the processor, and is disposed in a same device as the mobile communication module 150 or another functional module.

The modem 15011 may be a chip. For example, the modem 15011 may be an integrated circuit chip and has a signal processing capability. In an implementation process, steps to be implemented by the modem 15011 may be completed by using an integrated logic circuit of hardware in the modem 15011 or instructions in a form of software.

The application processor 110 and the communication processor 1501 may be integrated into a same wireless communication device or a same large chip (for example, a common SoC (system on a chip) chip in a mobile phone).

(4) Wireless Communication Module 140

The wireless communication module 140 may provide a solution, applied to the terminal device, to wireless communication including a wireless local area network (wireless local area network, WLAN) (for example, a wireless fidelity (wireless fidelity, Wi-Fi) network), Bluetooth (Bluetooth, BT), a global navigation satellite system (global navigation satellite system, GNSS), frequency modulation (frequency modulation, FM), near field communication (near field communication, NFC), an infrared (infrared, IR) technology, and the like. The wireless communication module 140 may be one or more components integrating at least one communication processing module. The wireless communication module 140 receives an electromagnetic wave by the antenna 2, performs frequency modulation and filtering processing on an electromagnetic wave signal, and sends a processed signal to the processor 100. The wireless communication module 140 may further receive a to-be-sent signal from the processor 100, perform frequency modulation and amplification on the signal, and convert the signal into an electromagnetic wave for radiation through the antenna 2.

(5) Memory 130

The memory 130 may be further disposed in the processor, and is configured to store instructions and data. In some embodiments, the memory in the processor is a cache. The memory may store instructions or data that have/has been used or cyclically used by the processor 100. If the processor needs to use the instruction or the data again, the processor may directly invoke the instruction or the data from the memory, to avoid repeated access and reduce a waiting time of the processor. Therefore, system efficiency can be improved.

The wireless communication apparatus may further include an external memory interface, configured to connect to an external memory card, for example, a Micro SD card, to extend a storage capability of the terminal device.

An internal memory may be configured to store computer-executable program code. The executable program code includes instructions. The internal memory may include a program storage area and a data storage area. The program storage area may store an operating system, an application required by at least one function (for example, a voice playing function or an image playing function), and the like. In addition, the internal memory 121 may include a high-speed random access memory, or may include a nonvolatile memory, for example, at least one magnetic disk storage device, a flash memory, or a universal flash storage (universal flash storage, UFS). The processor 100 performs various function applications and data processing of the terminal device by running the instructions stored in the internal memory 130 and/or the instructions stored in the memory disposed in the processor.

(6) Communication Interface 120

In some embodiments, the wireless communication apparatus may include one or more communication interfaces 120. For example, the communication interfaces 120 may include an inter-integrated circuit (inter-integrated circuit, I2C) interface, an inter-integrated circuit sound (inter-integrated circuit sound, I2S) interface, a pulse code modulation (pulse code modulation, PCM) interface, a universal asynchronous receiver/transmitter (universal asynchronous receiver/transmitter, UART) interface, a mobile industry processor interface (mobile industry processor interface, MIPI), a general-purpose input/output (general-purpose input/output, GPIO) interface, a subscriber identity module (subscriber identity module, SIM) interface, a universal serial bus (universal serial bus, USB) interface, and/or the like.

It should be understood that various components shown in the figure may be implemented in hardware, software, or a combination of hardware and software that includes one or more signal processing and/or application-specific integrated circuits. The terminal device shown in the figure is merely an example, and the terminal device may have more or fewer components than those shown in the figure, two or more components may be combined, or different component configurations may be used. Although not shown in FIG. 2a, the terminal device may further include other components, such as a power management module, a button, and an indicator. Details are not described herein.

Figure 2B:
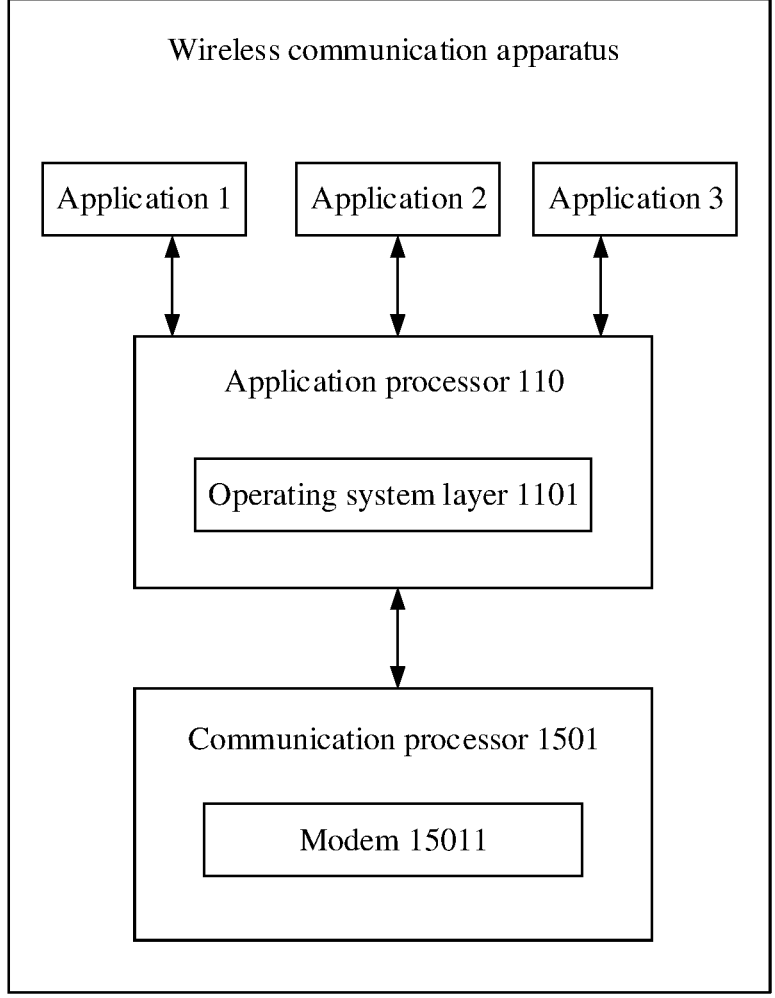
FIG. 2*b* is a schematic diagram of a structure of a wireless communication apparatus according to an embodiment of this application.

Based on the foregoing content, FIG. 2b is an example of a schematic diagram of a structure of a wireless communication apparatus according to an embodiment of this application. The wireless communication apparatus may be the wireless communication apparatus in FIG. 2a, or may be the wireless communication apparatus in FIG. 1. Compared with the wireless communication apparatuses in FIG. 1 and FIG. 2a, the wireless communication apparatus in FIG. 2b may include more or fewer components or modules than those shown in FIG. 1 and FIG. 2a. As shown in FIG. 2b, the wireless communication apparatus may include an application processor 110. The application processor 110 is configured to run an operating system. An operating system layer 1101 may be disposed in the application processor 110. In this embodiment of this application, at least one application such as an application 1, an application 2, and an application 3 may be further installed in the wireless communication apparatus. These applications may alternatively be run by the application processor 110. A communication processor 1501 may execute a communication protocol stack of the wireless communication apparatus, and is configured to receive and send data and the like.

For URSP, if an upper-layer system (for example, the operating system layer 1101) parses an URSP original code stream, because an operating system of the wireless communication apparatus is controlled by a system publisher, it is difficult to modify control layer code for a type of feature. Therefore, each manufacturer needs to develop and maintain a URSP feature by itself, and protocol parsing code at the operating system layer 1101 needs to be synchronously modified with upgrade of a 3GPP protocol, which causes high development and maintenance costs. In addition, for some small wireless communication apparatuses, such as a router, these wireless communication apparatuses each may not have an operating system layer 1101, but have only one application control layer, basically does not have a capability of parsing the URSP original code stream, and are more difficult to upgrade with the upgrade of the 3GPP protocol. Therefore, currently the URSP feature cannot be implemented on such wireless communication apparatuses.

In view of this, this embodiment of this application provides a solution, to implement a URSP feature by using the communication processor 1501, that is, implement a URSP selection function during establishment of a protocol data unit (protocol data unit, PDU) session (session). In this way, if the communication processor in this embodiment of this application is installed in a wireless communication apparatus produced by a manufacturer of each wireless communication apparatus, no costs need to be invested in developing and maintaining the URSP feature at the operating system layer 1101. In addition, for a wireless communication apparatus that has no operating system, or whose operating system does not have a capability of performing decoding based on an original code stream corresponding to a URSP rule, the URSP feature may alternatively be implemented by using the installed communication processor 1501. In addition, according to the solution provided in this embodiment of this application, the upper-layer system (for example, the operating system layer 1101) is almost not modified, or a modification amount is small, and no additional intermediate layer needs to be provided between the upper-layer system and the communication processor 1501.

Figure 3:
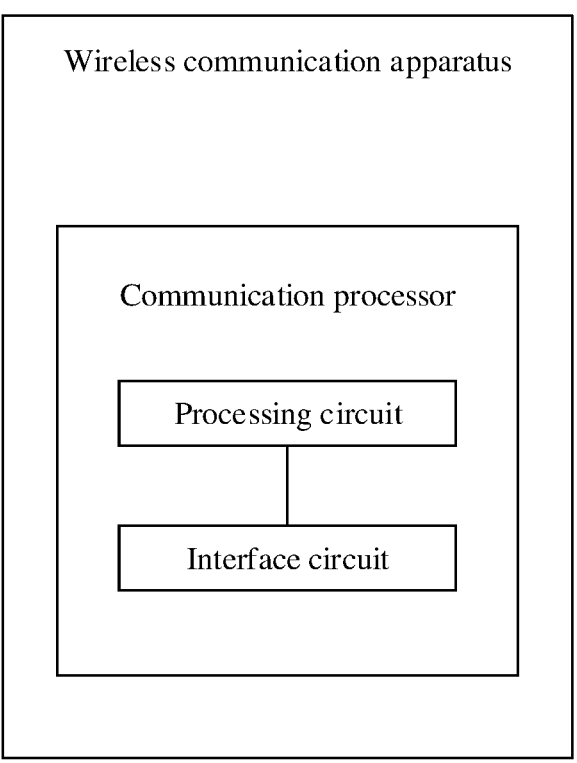
FIG. 3 is a schematic diagram of a structure of a wireless communication apparatus according to an embodiment of this application.

Based on the foregoing content, FIG. 3 is an example of a schematic diagram of a structure of a wireless communication apparatus according to an embodiment of this application. The wireless communication apparatus may be the wireless communication apparatus in FIG. 2b, or the wireless communication apparatus may be the wireless communication apparatus in FIG. 2a, or may be the wireless communication apparatus in FIG. 1. Compared with the wireless communication apparatuses in FIG. 1, FIG. 2a, and FIG. 2b, the wireless communication apparatus shown in FIG. 3 may include only a communication processor. As shown in FIG. 3, the wireless communication apparatus may include the communication processor, and the communication processor may include a processing circuit and an interface circuit. The interface circuit may be configured to input and output information. The processing circuit may be configured to execute a computer-executable program, so that a method embodiment on a communication processor side provided in embodiments of this application is executed.

The processing unit may be a processor or a controller, such as a general-purpose central processing unit (central processing unit, CPU), a general-purpose processor, a digital signal processor (digital signal processor, DSP), an application-specific integrated circuit (application-specific integrated circuit, ASIC), a field programmable gate array (field programmable gate array, FPGA), or another programmable logic device, a transistor logic device, a hardware component, or any combination thereof. The processor may implement or execute various example logical blocks, modules, and circuits described with reference to content disclosed in this application. Alternatively, the processor may be a combination of processors implementing a computing function, for example, including a combination of one or more microprocessors, or a combination of a DSP and a microprocessor. The processing circuit may execute computer-executable instructions stored in a storage module.

The interface circuit may be a unit, a module, or an interface that is on the communication processor and that is configured to transmit information. A function of the interface circuit may alternatively be implemented by a transceiver module, a transceiver, a communication module, or the like in the communication processor. The interface circuit may be configured to receive a signal from another apparatus. For example, when the communication processor is implemented in a form of a chip, the communication processor is an interface circuit used by the chip to receive a signal from another chip or apparatus, or is an interface circuit used by the chip to send a signal to another chip or apparatus. The interface circuit may be, for example, a transceiver. Optionally, the transceiver may include a radio frequency circuit. The interface circuit may be, for example, an input/output interface, a pin, or a circuit.

In still another possible implementation, the processing circuit may invoke a computer-executable program stored in a storage module, so that the method embodiment on the communication processor side provided in embodiments of this application is performed. The storage module may be a memory. Optionally, the storage module may be a storage module in the chip, such as a register or a cache, or the storage module may be a storage module outside the chip in a communication apparatus, such as a read-only memory (read-only memory, ROM), another type of static storage device that can store static information and static instructions, or a random access memory (random access memory, RAM).

Specifically, functions/implementation processes of the interface circuit and the processing circuit in FIG. 3 may be implemented by the communication processor 1501 in the wireless communication apparatus shown in FIG. 2a or FIG. 2b by invoking the computer-executable instructions stored in the memory. Alternatively, a function/implementation process of the processing circuit in FIG. 3 may be implemented by the communication processor 1501 in the wireless communication apparatus shown in FIG. 2a or FIG. 2b by using the computer-executable instruction stored in the memory, and the function/implementation process of the interface circuit in FIG. 3 may be implemented by the communication interface in the communication processor 1501 in the wireless communication apparatus shown in FIG. 2a or FIG. 2b.

The solutions provided in embodiments of this application are specifically described based on the foregoing content. Before that, for ease of understanding of embodiments of this application, a "user route selection policy" in this application is first described.

The 3GPP defines a user route selection policy rule (which may be referred to as a URSP, or a URSP rule for short, or a URSP rule; and a target URSP rule in this specification may also be referred to as a target URSP rule, or the like). The URSP rule may include a rule precedence (Rule Precedence), a traffic descriptor (Traffic Descriptor, TD), and a route selection descriptor (Route Selection Descriptor, RSD). One URSP rule may include one traffic descriptor and one or more route selection descriptors.

In this embodiment of this application, the traffic descriptor may include at least one of an application descriptor, an IP descriptor, a domain descriptor, a non-IP descriptor, a data network name (Data Network name, DNN), or a connection capability. In this embodiment of this application, the route selection descriptor may include at least one of a route selection descriptor preference, service and session continuity mode (service and session continuity mode, SSC) selection, network slice selection, PDU session type selection, a non-seamless offload indication, an access type preference, a route selection validity criterion, a time window, or location criterion.

Content in the URSP rule and content in the traffic descriptor are described below with reference to Table 1, and content in the route selection descriptor is described below with reference to Table 2. It should be noted that content included in the URSP rule defined in this embodiment of this application is merely an example. With development of technologies, the URSP rule may further include other information, or some components or parameters in the example are deleted; or another component or parameter is further added to the traffic descriptor, or some components or parameters in the traffic descriptor are deleted. It is possible that the route selection descriptor further includes other components or parameters, or some components or parameters of the route selection descriptor in this example are deleted.

TABLE 1

User route selection policy rule

| Information name (Information name) | Descriptor (Descriptor) | Category (Category) |
|---|---|---|
| Rule precedence (Rule Precedence) | Determine the order the URSP rule is enforced in the UE. (Determines the order the URSP rule is enforced in the UE.) | Mandatory (Mandatory) (Note 1) |
| Traffic descriptor (Traffic descriptor) | This part defines the traffic descriptor components for the URSP rule (This part defines the Traffic descriptor components for the URSP rule.) | Mandatory (Mandatory) (Note 3) |
| Application descriptor (Application descriptors) | Include an operating system identifier and an operating system-specific application identifier (Note 2). (It consists of OSId and OSAppId(s). (NOTE 2)) | Optional (Optional) |
| IP descriptor (Note 5) | Target internet protocol (Internet Protocol, IP) 3-tuple (IP address or IPv6 network | Optional (Optional) |

TABLE 1-continued

User route selection policy rule

| Information name (Information name) | Descriptor (Descriptor) | Category (Category) |
|---|---|---|
| (IP descriptors (NOTE 5)) | prefix, port number, and protocol identifier of the protocol above IP). (Destination IP 3 tuple(s) (IP address or IPv6 network prefix, port number, protocol ID of the protocol above IP).) | |
| Domain descriptor (Domain descriptors) | Target fully qualified domain name (fully qualified domain name, FQDN) or a regular expression as a domain name matching criterion. (Destination FQDN(s) or a regular expression as a domain name matching criteria.) | Optional (Optional) |
| Non-IP descriptor (Note 5) (Non-IP descriptors (NOTE 5)) | Descriptor(s) for destination information of non-IP traffic (Descriptor(s) for destination information of non-IP traffic) | Optional (Optional) |
| DNN | This is matched against the DNN information provided by the application (This is matched against the DNN information provided by the application.) | Optional (Optional) |
| Connection capabilities (Connection Capabilities) | This is matched against the information provided by a UE application when it requests a network connection with certain capabilities. (NOTE 4) This is matched against the information provided by a UE application when it requests a network connection with certain capabilities. (NOTE 4) | Optional (Optional) |
| RSD list (List of Route Selection Descriptors) | A list of Route Selection Descriptors. The components of an RSD are described in table 2. (A list of Route Selection Descriptors. The components of a Route Selection Descriptor are described in table 2). | Mandatory (Mandatory) |

Note 1:

Rules in a URSP shall have different precedence values. (Rules in a URSP shall have different precedence values.)

Note 2:

The information is used to identify the Application(s) that is(are) running on the UE's operating system. The OSID does not include an OS version number. The OSAppID does not include a version number for the application. (The information is used to identify the Application(s) that is(are) running on the UE's OS. The OSId does not include an OS version number. The OSAppId does not include a version number for the application.)

Note 3:

At least one of the traffic descriptor components shall be present. (At least one of the Traffic descriptor components shall be present.)

Note 4:

The format and some values of Connection Capabilities, e.g. "ims", "mms", "internet", etc., are defined in 3GPP TS 24.526. More than one connection capabilities value can be provided. (The format and some values of Connection Capabilities, e.g. "ims", "mms", "internet", etc., are defined in TS 24.526 [19]. More than one connection capabilities value can be provided.)

Note 5:

A URSP rule cannot contain the combination of the traffic descriptor components IP descriptors and non-IP descriptors. (A URSP rule cannot contain the combination of the Traffic descriptor components IP descriptors and Non-IP descriptors.)

TABLE 2

Route selection descriptor

| Information name (Information name) | Descriptor (Descriptor) | Category (Category) |
|---|---|---|
| Route selection descriptor precedence (Route Selection Descriptor Precedence) | Determine an order in which RSDs are to be applied (Determines the order in which the Route Selection Descriptors are to be applied. ) | Mandatory (Mandatory) (Note 1) |

US 12,574,825 B2

21 22

TABLE 2-continued

Route selection descriptor

| Information name<br>(Information name) | Descriptor (Descriptor) | Category<br>(Category) |
|---|---|---|
| Route selection<br>components<br>(Route selection<br>components) | This part may define the route selection<br>components.<br>(This part defines the route selection components) | Mandatory<br>(Mandatory)<br>(Note 2) |
| SSC mode selection<br>(SSC Mode<br>Selection) | Value of the SSC mode (Note 5)<br>(One single value of SSC mode. (NOTE 5) | Optional<br>(Optional) |
| Network slice<br>selection<br>(Network Slice<br>Selection, NSS) | A single value or a list of values of session<br>management-network slice selection assistance<br>information (session management-network slice<br>selection assistance information, S-NSSAI).<br>(Either a single value or a list of values of S-<br>NSSAI(s).) | Optional<br>(Optional)<br>(Note 3) |
| DNN selection<br>(DNN Selection) | Either a single value or a list of values of DNN(s)<br>(Either a single value or a list of values of DNN(s).) | Optional<br>(Optional) |
| PDU session type<br>selection<br>(PDU Session Type<br>Selection) | Value of the PDU session type.<br>(One single value of PDU Session Type.) | Optional<br>(Optional)<br>(Note 8) |
| Non-seamless<br>offload indication<br>(Non-Seamless<br>Offload indication) | Indicate if the traffic of the matching application is to<br>be offloaded to non-3GPP access outside of a PDU<br>session.<br>(Indicates if the traffic of the matching application is to<br>be offloaded to non-3GPP access outside of a PDU<br>Session.) | Optional<br>(Optional)<br>(Note 4) |
| Access type<br>preference<br>(Access Type<br>preference) | Indicate the preferred access type (3GPP or non-3GPP<br>or multi-access) when the UE establishes a PDU<br>session for the matching application.<br>(Indicates the preferred Access Type (3GPP or non-<br>3GPP or Multi-Access) when the UE establishes a<br>PDU Session for the matching application.) | Optional<br>(Optional) |
| Route selection<br>validation criteria<br>(note 6)<br>(Route Selection<br>Validation Criteria)<br>(NOTE 6) | This part defines the route validation criteria<br>components.<br>(This part defines the Route Validation Criteria<br>components.) | Optional<br>(Optional) |
| Time window<br>(Time Window) | The time window when the matching traffic is allowed.<br>The RSD is not considered to be valid if the current<br>time is not in the time window.<br>(The time window when the matching traffic is<br>allowed. The RSD is not considered to be valid if the<br>current time is not in the time window.) | Optional<br>(Optional) |
| Location criteria<br>(Location Criteria) | The UE location where the matching traffic is allowed.<br>The RSD rule is not considered to be valid if the UE<br>location does not match the location criteria.<br>(The UE location where the matching traffic is<br>allowed. The RSD rule is not considered to be valid if<br>the UE location does not match the location criteria.) | Optional<br>(Optional) |

Note 1:
Every route selection descriptor in the list shall have a different precedence value. (Every Route Selection Descriptor in the list shall have a different precedence value.)
Note 2:
At least one of the route selection components shall be present. (At least one of the route selection components shall be present.)
Note 3:
When the subscription information contains only one S-NSSAI in a unified data repository (unified data repository, UDR), the PCF needs not provision the UE with S-NSSAI in the network slice selection information. The "match all" URSP rule has one S-NSSAI at most. (When the Subscription Information contains only one S-NSSAI in UDR, the PCF needs) not provision the UE with S-NSSAI in the Network Slice Selection information. The "match all" URSP rule has one S-NSSAI at most.)
Note 4:
If this indication is present in a route selection descriptor, no other components shall be included in the route selection descriptor. (If this indication is present in a Route Selection Descriptor, no other components shall be included in the Route Selection Descriptor.)
Note 5:
The SSC mode 3 shall only be used when the PDU session type is IP. (The SSC Mode 3 shall only be used when the PDU Session Type is IP.)
Note 6:
The route selection descriptor is not considered valid unless all the provided validation criteria are met. (The Route Selection Descriptor is not considered valid unless all the provided Validation Criteria are met.)
Note 7:
In this release of specification, inclusion of the validation criteria in roaming scenarios is not considered. (In this Release of specification, inclusion of the Validation Criteria in Roaming scenarios is not considered.)
Note 8:
When the PDU session type is "Ethernet" or "unstructured", this component shall be present. (When the PDU Session Type is "Ethernet" or "Unstructured", this component shall be present.)

Figure 4A:
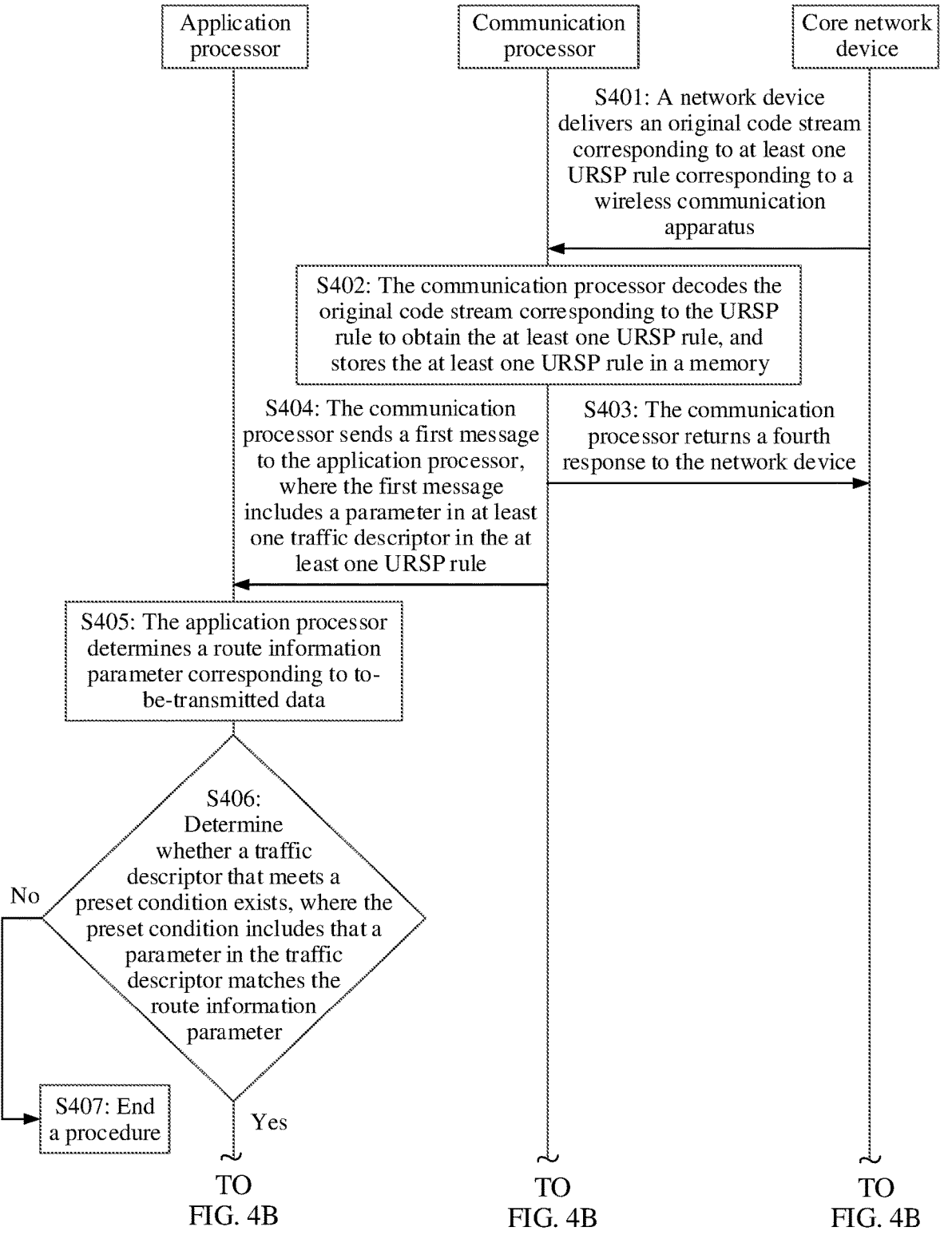

Based on the foregoing content, FIG. 4A and FIG. 4B are an example of a schematic flowchart of a possible communication method according to an embodiment of this application. As shown in FIG. 4A and FIG. 4B, the method may be performed by the wireless communication apparatus in FIG. 2a, FIG. 2b, and FIG. 3. The wireless communication apparatus may be the terminal device 10 or the access network device 20 in FIG. 1, or may be a chip, for example, a chip inside the terminal device 10, or a chip inside the access network device 20.

In a possible implementation, the wireless communication apparatus includes only a communication processor, for example, the wireless communication apparatus shown in FIG. 3.

In another possible implementation, the wireless communication apparatus may include an application processor and a communication processor, for example, the wireless communication apparatus shown in FIG. 2a or FIG. 2b. The application processor is coupled to the communication processor. The application processor may be the application processor 110 in FIG. 2a and FIG. 2b, and the communication processor may be the communication processor 1501 or the modem 15011 in FIG. 2a and FIG. 2b. The method may further include a network device, and the network device may be the core network device 30 in FIG. 1.

It should be noted that a session in this embodiment of this application may be a session in a plurality of communication systems, for example, may be a PDU session in a 5G system, or may be a session in a future communication system architecture. In the future system architecture, the session may still use a name PDU session in 5G, or may use another name. This is not limited in this embodiment of this application. To describe the solutions provided in embodiments of this application more clearly, in this embodiment of this application, an example in which the session is the PDU session in the 5G system is used for description. If another name is changed for a future session, the name of the PDU session is correspondingly replaced with the another name.

As shown in FIG. 4A and FIG. 4B, the method includes the following steps.

S401: The communication processor receives an original code stream that corresponds to at least one URSP rule corresponding to the wireless communication apparatus and that is delivered by a network device.

S402: The communication processor decodes the original code stream corresponding to the URSP rule to obtain the at least one URSP rule, and stores the at least one URSP rule in a memory.

In a possible implementation, the original code stream corresponding to the URSP rule may be included in an original code stream of a UE section policy.

S403: The communication processor returns a fourth response to the network device.

The fourth response may indicate to the network device that the wireless communication apparatus has successfully received the URSP rule.

It should be noted that in this embodiment of this application, the communication processor obtains the URSP rule in a plurality of manners. In addition to the solutions in S401 to S403, for example, the URSP rule may be obtained in a preset manner, or may be generated according to a preset rule. Steps S401 to S403 are not mandatory.

In a possible implementation, one URSP rule includes one traffic descriptor and at least one route selection descriptor. Alternatively, each URSP rule may have a URSP rule precedence. To-be-transmitted data may match a plurality of URSP rules. In this case, the to-be-transmitted data may be sequentially used based on precedences of the plurality of URSP rules.

In a possible implementation, one traffic descriptor includes at least one parameter. For example, at least one parameter used to describe routing information may be included. For example, one traffic descriptor may include at least one of the following parameters: a destination address parameter, a data network parameter, an application descriptor, or a connection capability parameter.

The destination address parameter may include at least one of the following parameters: a domain descriptor, an internet protocol IP descriptor, or a non-IP descriptor. The data network parameter may include at least one of the following parameters: a DNN, a data network type, or an access name. The non-IP descriptor may include 802.1Q C-TAG VID, 802.1Q S-TAG VID, 802.1Q C-TAG PCP/DEI, 802.1Q S-TAG PCP/DEI, Ethertype, and the like.

For parameters included in the traffic descriptor in this embodiment of this application, refer to the foregoing Table 1. Details are not described herein again.

In a possible implementation, one route selection descriptor includes at least one parameter, for example, may include a parameter that the PDU session needs to meet. In a possible implementation, the parameter that the PDU session needs to meet includes at least one of the following content: a parameter of a network required by the PDU session; a parameter of a network slice required by the PDU session; or a parameter of a session service required by the PDU session.

The parameter of the network may include at least one of the following content: a PDU session type, a data network name DNN, an access type preference, or a non-seamless offload indication. The parameter of the network slice may include at least one of the following parameters: a network slice type or a network slice name. The parameter of the session service may include a session service continuity SSC parameter.

For parameters included in the route selection descriptor in this embodiment of this application, also refer to the foregoing Table 2. Details are not described herein again. Each route selection descriptor may further correspond to a route selection descriptor precedence. In this way, when a plurality of route selection descriptors are matched, the plurality of route selection descriptors may be used in sequence based on precedences of the plurality of route selection descriptors during PDU session initiation.

S404: The communication processor sends a first message to the application processor, where the first message includes a parameter in at least one traffic descriptor in the at least one URSP rule.

In a possible implementation, the first message includes at least one parameter in the at least one traffic descriptor in the at least one URSP rule. In another possible implementation, the first message includes all parameters in the at least one traffic descriptor in the at least one URSP rule.

The first message may be an AT command, or certainly may be another command. An AT command set is a control protocol invented by Hayes (Hayes), the inventor of a dial-up modem (MODEM), for controlling the modem. AT is short for attention. The protocol itself uses text. Each command starts with AT.

The present document specifies a profile of AT commands and recommends that this profile be used for controlling mobile termination (MT) functions and network services from a terminal equipment (TE) through terminal adaptor (TA). The command prefix +C is reserved for digital cellular in ITU T Recommendation V.250. Corresponding description in English is given as follows:

"The present document specifies a profile of AT commands and recommends that this profile be used for controlling Mobile Termination (MT) functions and network services from a Terminal Equipment (TE) through Terminal Adaptor (TA). The command prefix +C is reserved for Digital Cellular in ITU T Recommendation V.250."

In a possible implementation, the first message is applicable to a 5G network, and is used to send the at least one traffic descriptor in the at least one URSP rule (which may also be understood as a function of the first message: used to transmit TD report). In this embodiment of this application, the first message may be a newly defined AT command, for example, may be +C5GTDRPT; +CTDRPT; +CURSPRPT; or +C5GTD. In this embodiment of this application, the first message may have a plurality of names, which is not limited thereto.

S405: The application processor determines a route information parameter corresponding to the to-be-transmitted data.

In a possible implementation, when the wireless communication apparatus is a mobile phone, the route information parameter may be determined based on an application on the mobile phone started by a user. In another possible implementation, when the wireless communication apparatus is a router, the route information parameter may be determined based on the to-be-transmitted data. Before performing data transmission with a network (in other words, before a data service of the wireless communication apparatus is activated), the wireless communication apparatus needs to establish a network connection. The connection may be a PDU session connection. The PDU session connection may be a newly established PDU session connection, or may be a previously established PDU session connection. This part is described in detail in the following content and is not described in detail herein.

In this embodiment of this application, the route information parameter includes at least one of the following parameters: a destination address parameter of the to-be-transmitted data, a data network parameter corresponding to the to-be-transmitted data, an application descriptor corresponding to the to-be-transmitted data, or a connection capability parameter corresponding to the to-be-transmitted data.

The destination address parameter may include at least one of the following parameters: a domain descriptor corresponding to the to-be-transmitted data, an IP descriptor corresponding to the to-be-transmitted data, or a non-IP descriptor corresponding to the to-be-transmitted data. The data network parameter may include at least one of the following parameters: a DNN, a data network type, or an access name. The domain descriptor may be a target fully qualified domain name (fully qualified domain name, FQDN) or a regular expression as a domain name matching criterion. The IP descriptor may be a target IP 3-tuple (an IP address or an IPv6 network prefix, a port number, or the like).

S406: The application processor determines whether a traffic descriptor that meets a preset condition exists in the received at least one traffic descriptor. The preset condition includes: A parameter in the traffic descriptor matches the route information parameter.

If the traffic descriptor that meets the preset condition does not exist, S407 is performed.

If the traffic descriptor that meets the preset condition exists, S408 is performed.

S407: End a procedure.

In this embodiment of this application, in a possible implementation, all parameters included in the traffic descriptor that meets the preset condition are the same as parameters in the route information parameter. For example, one traffic descriptor includes only a destination address parameter, and the route information parameter includes the destination address parameter and the data network parameter. If the destination address parameter in the traffic descriptor is the same as the destination address parameter in the route information parameter, the traffic descriptor meets the preset condition. For another example, one traffic descriptor includes a destination address parameter and a data network parameter, and the route information parameter includes only the destination address parameter. Even if the destination address parameter in the traffic descriptor is the same as the destination address parameter in the route information parameter, because the data network parameter in the traffic descriptor does not match the data network parameter in the route information parameter, it is determined that the traffic descriptor does not meet the preset condition.

In a possible implementation, in S406, if the application processor determines that there is one traffic descriptor in the received at least one traffic descriptor, and all parameters included in the traffic descriptor are the same as some or all parameters in the route information parameter, the application processor may further query whether there is one active PDU session (that is, an established PDU session connection). The PDU session matches a parameter in the traffic descriptor (that is, the PDU session is a PDU session that meets a route selection descriptor, and a parameter in the traffic descriptor corresponding to the route selection descriptor is the same as the parameter in the traffic descriptor). If the active PDU session exists, the data may be transmitted by using the active PDU session. If the active PDU session does not exist, S407 may be performed.

In a possible implementation, because the application processor may perform preliminary screening, the application processor may send a first request after determining that the traffic descriptor corresponding to the route information parameter exists in the URSP rule delivered by the network. In another possible implementation, if it is found that the traffic descriptor matching the route information parameter does not exist in the URSP rule delivered by the network, an original solution may be used. To be specific, after receiving a session activation request, the communication processor does not query the route selection descriptor, but directly initiates the session to the network. However, the parameter in the route selection descriptor is no longer used as a dialing parameter in the session. In still another possible implementation, if the traffic descriptor matching the route information parameter does not exist in the URSP rule delivered by the network, it may be determined that the PDU session is activated unsuccessfully.

It should be noted that S404 and S406 are not mandatory. If S404 to S406 exist, the application processor may perform preliminary screening, and when it is determined that a TD matching a first parameter exists, the application processor sends the first request. If S404 to S406 are not performed, S408 may alternatively be performed after the application processor directly obtains the first parameter.

S408: The application processor sends the first request to the communication processor. The first request is used to query the route selection descriptor, the first request includes the route information parameter corresponding to the to-be-transmitted data, and the route selection descriptor matches the route information parameter.

Correspondingly, the communication processor receives the first request.

In this embodiment of this application, after receiving the first request, the communication processor may query whether a target URSP rule exists in the stored URSP rules, and a traffic descriptor in the target URSP rule matches the route information parameter. In a possible implementation, the traffic descriptor matching the route information parameter means that all or some parameters included in the traffic descriptor are the same as those in the route information parameter. For a related example, refer to the foregoing content. Details are not described again.

The first request in this embodiment of this application may be an AT command, or certainly may be another command. In a possible implementation, the first request is applicable to the 5G network, and is used to query the route selection descriptor (used to query RSD). In this embodiment of this application, the first request may be a newly defined AT command, for example, may be: +C5GRSDQRY; +C5GURSPQRY, +CURSPQRY; +CQRSD; +C5GQRSD; or +C5GRURSP. In this embodiment of this application, the first request may have a plurality of names, which is not limited thereto.

S409: The communication processor finds the target URSP rule.

S410: The communication processor returns a first response to the application processor, where the first response may include at least one parameter of at least one route selection descriptor in the target URSP rule.

In a possible implementation, the first response may include all parameters in the at least one route selection descriptor in the target URSP rule.

For parameters included in the route selection descriptor, refer to the foregoing content. Details are not described herein again.

In this embodiment of this application, there may be one or more target URSP rules found. When there are a plurality of target URSP rules, at least one parameter in at least one route selection descriptor of the plurality of target URSP rules may be returned to the application processor by using one first response, or at least one parameter in at least one route selection descriptor of each of the plurality of target URSP rules may be returned to the application processor by using a plurality of first responses. For example, one first response may carry all parameters in one route selection descriptor in one target URSP rule.

In a possible implementation, when there are a plurality of target URSP rules, the communication processor may further send precedences of the plurality of target URSP rules to the application processor, so that the application processor uses the route selection descriptor in the target URSP rule based on the precedences.

In a possible implementation, the first response may further carry a precedence of the at least one route selection descriptor in the target URSP rule. In this way, the application processor may use the plurality of route selection descriptors in sequence based on the precedences of the plurality of route selection descriptors.

In another possible implementation, in S410, the communication processor may further query whether there is an activated PDU session (that is, an established PDU session connection), where the PDU session matches the at least one route selection descriptor in the target URSP rule (that is, the PDU session meets a parameter in the at least one route selection descriptor in the target URSP rule). If information about the active PDU session exists, in a possible implementation, the information about the activated PDU session may be carried in the first response and sent to the application processor, or the information about the activated PDU session may be returned to the application processor by using another message. In this way, the application processor may choose whether to directly use the activated PDU session or re-establish a PDU session.

S411: The application processor sends a third request to the communication processor. The third request is used to activate the PDU session. The third request may include the at least one parameter in the route selection descriptor.

After finding the at least one route selection descriptor in the at least one target URSP rule in S409, the application processor may sequentially select and use the route selection descriptor based on the precedence of the URSP rule and the precedence of the route selection descriptor, and carry parameters (which may be all parameters in the selected route selection descriptor or at least one parameter) in the currently selected route selection descriptor in the third request. The parameter in the route selection descriptor carried in the third request may be referred to as a dialing parameter. Then, the PDU session connection established based on the third request meets the dialing parameter carried in the third request.

The third request may be an AT command used to activate the PDU (used to activate 5GS PDU session), or certainly may be another command, for example, may be +CGACT.

In a possible implementation, in this embodiment of this application, after receiving the third request, the application processor may choose to query whether there is a PDU session in an active state (that is, an established PDU session connection), where the PDU session matches at least one route selection descriptor carried in the third request (that is, the PDU session meets a parameter of the route selection descriptor carried in the third request). If the active PDU session exists, in a possible implementation, information about the active PDU session may be sent to the application processor. In this way, the application processor may choose whether to directly use the activated PDU session or re-establish a PDU session. Certainly, if a historical PDU session has been queried when the first response is returned in S410, no query is performed after S411. Alternatively, if the application processor has queried whether there is a matched historical PDU session in S406, querying may not be required in S410 and S411.

S412: The communication processor sends a second request to the network device, where the second request is used to activate the PDU session, and the second request includes the at least one parameter in the route selection descriptor.

It should be noted that S410 and S411 are not mandatory. When S411 exists, in a possible implementation, a parameter in the route selection descriptor that may be carried by the communication processor in the second request is a parameter in the route selection descriptor carried in the third request.

In still another possible implementation, when S410 and S411 do not exist, the parameter in the route selection descriptor carried in the second request may be a parameter in a route selection descriptor selected in sequence based on a precedence of the URSP rule and a precedence of the route selection descriptor. The second request may carry all parameters or at least one parameter in the selected route selection descriptor.

In a possible implementation, the second request may be a PDU session establishment request, and may be written as PDU session establishment request in English. The second request is used to request to establish or activate a PDU session connection to a network, and the PDU session connection meets a parameter in a route selection descriptor carried in the second request.

S413: The communication processor receives a second response sent by the network device, where the second response indicates that the PDU session is successfully activated.

In this embodiment of this application, the second response may be a PDU session establishment accept, and may be written as PDU session establishment accept in English.

S414: The communication processor returns a third response to the application processor, where the third response indicates that the PDU session is successfully activated.

It should be noted that, if a response received after the communication processor sends the second request in S412 indicates that the PDU session fails to be activated, a route selection descriptor may be selected (for example, may be selected based on the precedence of the target URSP rule and the precedence of the route selection descriptor in the target URPS), and the second request is resent, to reactivate the PDU session. The second request may be repeatedly sent until the PDU session is successfully established, or until all route selection descriptors in all found target URSP rules are used and all PDU sessions fail to be established. The second request may be triggered by a third request re-sent by the application processor, or may be triggered after a message indicating that the PDU session fails to be activated is received.

Currently, the protocol does not specify use of URSP information. Only two related AT commands are defined in 3GPP 27.007. The modem reports UE section policy information delivered by the network to an upper-layer system in a form of original code streams by using a +CRUEPOLICY command. The upper-layer system decodes the original code streams of the UE section policy and sends a +CSUE-POLICY command to the modem. Then, the modem forwards the code streams to the network device. However, vendors develop and maintain upper-layer systems by using a URSP feature, which is costly. In addition, upper-layer systems of some wireless communication apparatuses do not have a capability of decoding an original code stream corresponding to a URSP rule. Based on this, in this embodiment of this application, after receiving the first request including the route information parameter, the communication processor may add the route selection descriptor to the sent second request, so that the established PDU session can meet the URSP feature. In addition, because the URSP feature of the wireless communication apparatus is implemented by using the communication processor, a vendor of the wireless communication apparatus does not need to develop and maintain an upper-layer system to implement the URSP feature, thereby reducing costs of the vendor of the wireless communication apparatus. In addition, for a wireless communication apparatus that does not have a capability of decoding an original code stream corresponding to a URSP rule, a URSP feature can be implemented by installing only the communication processor, thereby reducing complexity of implementing the URSP feature for the wireless communication apparatus with a weak capability. The solution provided in this embodiment of this application may be further applicable to a product that needs to optimize a PDU session establishment procedure (which may also be referred to as a data service activation procedure) based on a product feature, and has small impact on a data service processing procedure of an original product.

Based on the solution shown in FIG. 4A and FIG. 4B, the following shows an example of a first request syntax by using Table 3. Content in the first column is a parameter included in the first request. The second column is a value returned after the communication processor receives the first request. Table 4 shows an example of meanings of parameters in Table 3. In Table 3 and Table 4, an example in which the first request is named +C5GRSDQRY is used. In actual application, the first request may alternatively have another name.

TABLE 3

| +C5GRSDQRY command syntax description | |
|---|---|
| Command type | Return value |
| +C5GRSDQRY=[<APPID>] [,<OS ID&APPID>] [,<DNN>][,<FQDN>][,<Connection Capabilities >][,<remote ipv4 address and mask>] [,<remote ipv6 address and prefix length>][,<protocol number (ipv4)/next header (ipv6)>][,<single remote port>][,<remote port range>][, <security para index>][,<type of service (tos) (ipv4) and mask/traffic class (ipv6) and mask>][,<flow label>][,<ether type>] [,<destination mac address>][,<cTagVid>][,<sTagVid>] [,<cTagPcpDei>][,<sTagPcpDei>] | <CR><LF>+C5GRSDQRY: [<CID>],[<route selection descriptor type>],[<ursp rule precedence>],[<route selection descriptor precedence>],[< SSC mode >],[<mssai>],[<dnn>], [<pdu session type>],[<preferred access type>],[<Non-seamless non-3GPP offload indication>] <CR><LF>+C5GRSDQRY: [<CID>],[<route selection descriptor type>],[<ursp rule precendence>],[<route selection descriptor precedence>],[< SSC mode >],[<snssai>],[<dnn>], [<pdu session type>],[<preferred access type>],[<Non-seamless non-3GPP offload indication >] [...] ]<CR><LF> <CR><LF>OK<CR><LF> In case of an error: <CR><LF>+CME ERROR: <err><CR><LF> |

TABLE 4

| Parameter | Description |
|---|---|
| +C5GRSDQRY command parameter description | |
| APP ID | String type, ID bound to an APP (application) |
| OS ID&APPID | String type, an operating system OS ID and an APP ID. In the protocol, the OS ID occupies 16 bytes, a string length of the OS ID is 32, and remaining fields in the string identify the APP ID |
| DNN | String type: identifies the data network name. If a plurality of DNNs are delivered, the plurality of DNNs are separated by using semicolons (;). For example, "huawei.com;ims". |
| FQDN | String type, fully qualified domain name For example: "Huawei.enterprise.com.001" |
| Connection Capabilities | Integer value. When a capability is requested, a bit position corresponding to the capability is set to 1. For example, a value 3 indicates that IMS and MMS capabilities are requested at the same time. 00000001 IMS 00000010 MMS 00000100 SUPL 00001000 Internet |
| remote ipv4 address and mask | String type, remote IPv4 address and mask, in dotted format. Format example: "a1.a2.a3.a4.m1.m2.m3.m4" |
| remote ipv6 address and prefix length | String type, remote IPV6 address and IPV6 prefix length, in dotted format. A length unit of the prefix length is bit. Format example: "a1.a2.a3.a4.a5.a6.a7.a8.a9.a10.a11.a12.a13.a14.a15.a16/64" |
| protocol number (ipv4)/next header (ipv6) | Integer, indicating an upper-layer protocol number indicated in the IP header, for example, TCP or UDP. Numeric parameter, ranging from 0 to 255. |
| single remote port | Integer, remote port number, ranging from 0 to 65535. |
| remote port range | String type, remote port range. This parameter is in a hexadecimal form and a number around a dot cannot exceed 65535. For example, "f.t". f indicates a port lower limit, and t indicates a port upper limit. |
| security para index | Integer, which is a parameter of a security extension header (such as AH and ESP) in IPV6. Numeric parameter in a hexadecimal form, and ranges from 0x00000000 to 0xFFFFFFFF. |
| type of service (tos) (ipv4) and mask/traffic class (ipv6) and mask | String type, service type/service type. Strings are separated by dots. A number in the string ranges from 0 to 255. For a format example: t.m, where t indicates the service type or service type and m indicates a mask. |
| flow label | Integer, flow label, a parameter in a IPv6 basic header, identifying some packets whose source and destination addresses are the same. Numeric parameter in a hexadecimal form, and ranges from 0x00000 to 0xFFFFF. This parameter is valid only for IPV6. |
| ether type | Integer value |
| destination mac address | String, destination MAC address Format example: "aa:bb:cc: 11:22:33" |
| cTag Vid | Integer value, 802.1Q C-TAG VID |
| s Tag Vid | Integer value, 802.1Q S-TAG VID |
| cTagPcpDei | Integer value, 802.1Q C-TAG PCP/DEI |
| sTagPcpDei | Integer value, 802.1Q S-TAG PCP/DEI |
| CID | Integer value, local ID corresponding to the PDP context, eps bearer, or qos flow |
| route selection descriptor type | Indicates whether the RSD of the default URSP is an integer 0: non-default ursp route selection descriptor 1: default ursp route selection descriptor |
| ursp rule precedence | Integer value, ursp rule precedence |
| route selection descriptor precedence | Integer value, ursp selection descriptor precedence |
| SSC mode | Integer value, session and service continuity mode of a data service 0: SSC mode 1 1: SSC mode 2 2: SSC mode 3 |
| snssai | String type, 5GS fragment information "sst" if only slice/service type (SST) is present "sst;mapped_sst" if SST and mapped configured SST are present "sst.sd" if SST and slice differentiator (SD) are present "sst.sd;mapped_sst" if SST, SD and mapped configured SST are present "sstsd;mapped_sst.mapped_sd" if SST, SD, mapped configured SST and mapped configured SD are present Note: The data in the string is in hexadecimal format. The value range of the character is as follows: 0 to 9, A to F, a to f. |

TABLE 4-continued

| +C5GRSDQRY command parameter description | |
| --- | --- |
| Parameter | Description |
| pdu session type | String type, packet data protocol type IP: internet protocol (IPv4) IPV6: IPv6 protocol IPV4V6: IPV4 and IPV6. UNSTRUCT Ethernet: Ethernet protocol (The setting of this type is controlled by NV6066.) |
| preferred access type | Integer value, preferred access type in the 5GS system 0: 3GPP access 1: non-3GPP access |
| Non-seamless non-3GPP offload indication | Integer 0: invalid Non-seamless non-3GPP offload indication 1: valid Non-seamless non-3GPP offload indication |

Figure 5A:
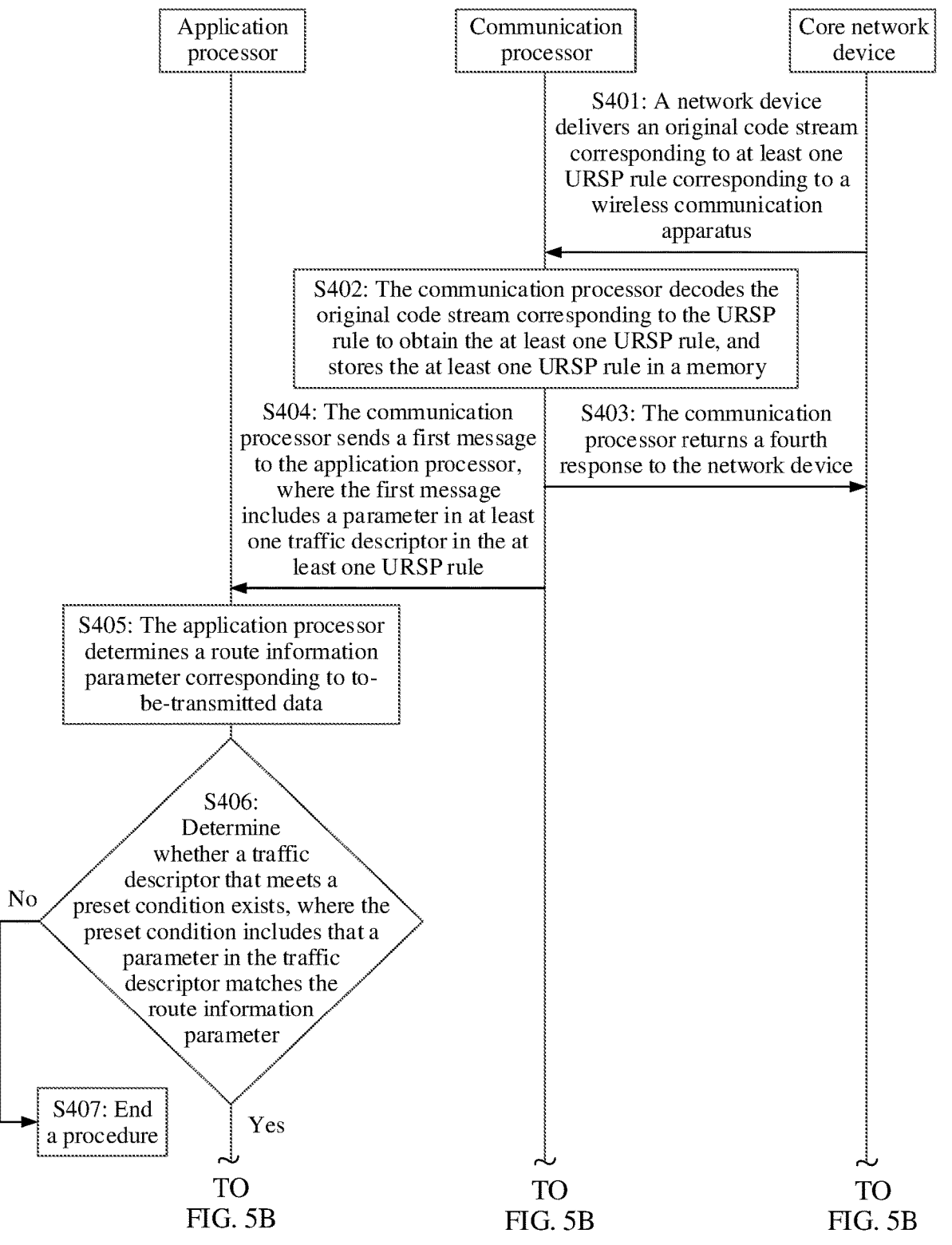

Based on the foregoing content, FIG. 5A and FIG. 5B are an example of a schematic flowchart of another possible communication method according to an embodiment of this application. As shown in FIG. 5A and FIG. 5B, the method may be performed by the wireless communication apparatuses in FIG. 2*a* and FIG. 2*b*. The wireless communication apparatus may be the terminal device 10 or the access network device 20 in FIG. 1, or may be a chip, for example, a chip inside the terminal device 10, or a chip inside the access network device 20.

The wireless communication apparatus includes an application processor and a communication processor. The application processor is coupled to the communication processor. The application processor may be the application processor 110 in FIG. 2*a* and FIG. 2*b*, and the communication processor may be the communication processor 1501 or the modem 15011 in FIG. 2*a* and FIG. 2*b*. The method may further include a network device, and the network device may be the core network device 30 in FIG. 1.

As shown in FIG. 5A and FIG. 5B, the method includes the following steps.

For steps S401 to S407 in FIG. 5A and FIG. 5B, refer to steps S401 to S407 in FIG. 4A and FIG. 4B. In S406 in FIG. 5A and FIG. 5B, if it is determined that a traffic descriptor that meets a preset condition exists, S501 is performed. Similar to the content in FIG. 4A and FIG. 4B, S401 to S407 are optional steps and are not mandatory.

S501: The application processor sends a first request to the communication processor. The first request includes a route information parameter corresponding to to-be-transmitted data, and a route selection descriptor matches the route information parameter. The first request is used to activate a PDU session. In other words, the first request is used to query the route selection descriptor, and is further used to activate the PDU session.

Correspondingly, the communication processor receives the first request.

In this embodiment of this application, after receiving the first request, the communication processor may query whether a target URSP rule exists in the stored URSP rules, and a traffic descriptor in the target URSP rule matches the route information parameter. In a possible implementation, the traffic descriptor matching the route information parameter means that all or some parameters included in the traffic descriptor are the same as those in the route information parameter. For a related example, refer to the foregoing content. Details are not described again.

The first request in this embodiment of this application may be an AT command. For details about the AT command, see the preceding parameters.

In a possible implementation, the first request is applicable to a 5G network and is used to activate the route selection descriptor (used to activate 5GS PDU session). In this embodiment of this application, the first request may be a newly defined AT command, for example, may be: +CACTPDU; +CPSDIAL; +CPDUACT; +CPDUEST; or +CPDUCONN. In this embodiment of this application, the first request may have a plurality of names, which is not limited thereto.

S502: The communication processor finds the target URSP rule.

In another possible implementation, S503 may be directly performed after S502.

In another possible implementation, in S502, the communication processor may further query whether there is an activated PDU session (that is, an established PDU session connection), where the PDU session matches at least one route selection descriptor in the target URSP rule (that is, the PDU session meets a parameter in the at least one route selection descriptor in the target URSP rule). If the activated PDU session exists, in a possible implementation, information about the activated PDU session may be returned to the application processor, and a message (for example, a third response in S414) indicating that the PDU session is successfully activated is directly sent to the application processor. After receiving the message, the application processor may transmit data by using the activated PDU session. In this scenario, the communication processor does not need to perform S503 and S413. In addition, if no activated PDU session matches the at least one route selection descriptor in the target URSP rule, S503 may continue to be performed.

S503: The communication processor sends a second request to the network device, where the second request is used to activate the PDU session, and the second request includes at least one parameter in the route selection descriptor.

Parameters in the route selection descriptor carried in the second request may be parameters in the route selection descriptor that are sequentially selected by the communication processor based on a precedence of the found target URSP rule and a precedence of the route selection descriptor. The second request may carry all parameters or the at least one parameter in the selected route selection descriptor.

In a possible implementation, the second request may be a PDU session establishment request, and may be written as PDU session establishment request in English. The second request is used to request to establish or activate a PDU session connection to a network, and the PDU session connection meets a parameter in the route selection descriptor carried in the second request.

After S503, S413 and S414 may be performed. For related content, refer to S413 and S414 in FIG. 4A and FIG. 4B. Details are not described herein again.

It can be learned that, in the solution shown in FIG. 5A and FIG. 5B, the application processor sends only the first request, and then the communication processor completes URSP rule query and PDU activation (or the communication processor triggers data service dialing). In this way, changes to the application processor can be minimized, thereby laying a foundation for further improving competitiveness of the communication processor.

Based on the solution shown in FIG. 5A and FIG. 5B, the following shows an example of a first request syntax by using Table 5. Content in the first column is a parameter included in the first request. The second column is a value returned after the communication processor receives the first request. For meanings of the parameters included in the first request in Table 5, refer to content in Table 4. In Table 5, an example in which the first request is named +CACTPDU is used. In actual application, the first request may have another name.

TABLE 5

| +CACTPDU command syntax description | |
|---|---|
| Command type | Return value |
| +CACTPDU=[<APPID>] [,<OS ID&APPID>] [,<DNN>][,<FQDN>][,<Connection Capabilities>] [,<remote ipv4 address and mask>] [,<remote ipv6 address and prefix length>][,<protocol number (ipv4)/ next header (ipv6)>][,<single remote port>][,<remote port range>][,<security para index>][,<type of service (tos)(ipv4) and mask/traffic class (ipv6) and mask>][,<flow label>][,<ether type>] [,<destination mac address>][,<cTagVid>][,<sTagVid>][,<cTagPcpDei>][,<sTag PcpDei>] | <CR><LF>OK<CR><LF> In case of an error: <CR><LF>+CME ERROR: <err><CR><LF> |

Based on S404 in the solutions shown in FIG. 4A and FIG. 4B and FIG. 5A and FIG. 51B, the following shows an example of a first message syntax by using Table 6 and Table 7. Content in the first column in Table 6 is a parameter included in the first message. The second column is a value returned after the communication processor receives the first message. Table 7 shows an example of meanings of parameters included in the first column in Table 6. In Table 6 and Table 7, an example in which the first message is +C5GTDRPT" is used. In actual application, the first message may alternatively have another name.

TABLE 6

| +C5GTDRPT command syntax description | |
|---|---|
| Command type | Return value |
| +C5GTDRPT: [<type>], [<length>], [<code>] | |

TABLE 7

| +C5GTDRPT command parameter description | |
| --- | --- |
| Parameter | Description |
| type | Integer |
| | 1: Application identifier (Application Identifiers); |
| | 2: Internet protocol descriptors (IP descriptors), |
| | including IPv4/IPv6 remote address, Protocol identifier/next header, and remote port; |
| | 3: Non-internet protocol descriptor (non-IP descriptors), |
| | including 802.1Q C-TAG VID, 802.1Q S-TAG VID, 802.1Q C-TAG PCP/DEI, 802.1Q S-TAG PCP/DEI, Ethertype, and the like; |
| | 4: Data network name (DNN); |
| | 5: Connection capabilities (Connection Capabilities); and |
| | 6: Domain descriptors (Domain Descriptors); |
| length | Integer type, code stream length |
| code | String type, the TD parameter information in the reported URSP. Descriptors are separated by semicolons (;), for example, "appId1;appId2;appId3", "dnn1;dnn2;dnn3", or "fqdn1;fqdn2". |

The terms "system" and "network" may be used interchangeably in embodiments of this application. "At least one" means one or more, and "a plurality of" means two or more. A term "and/or" describes an association relationship between associated objects and indicates that three relationships may exist. For example, A and/or B may indicate the following cases: Only A exists, both A and B exist, and only B exists, where A and B may be singular or plural. The character "/" generally indicates an "or" relationship between the associated objects. At least one of the following items (pieces) or a similar expression thereof refers to any combination of these items, including any combination of singular items (pieces) or plural items (pieces). For example, at least one of a, b, or c may indicate: a, b, c, a-b, a-c, b-c, or a-b-c, where a, b, and c may be singular or plural.

In addition, unless otherwise stated, ordinal numbers such as "first" and "second" in embodiments of this application are used to distinguish between a plurality of objects, and are not used to limit an order, a time sequence, precedences, or importance of the plurality of objects. For example, the first request and the second request are merely used to distinguish between different requests, and do not indicate different precedences, different importance, or the like of the two requests.

It should be understood that division into the foregoing units of the communication device is merely logical function division. During actual implementation, all or a part of the units may be integrated into one physical entity, or may be physically separated.

According to the method provided in embodiments of this application, this application further provides a computer program product. The computer program product includes computer program code. When the computer program code is run on a computer, the computer is enabled to perform the method in any one of the embodiments.

According to the method provided in embodiments of this application, this application further provides a computer-readable storage medium. The computer-readable medium stores program code. When the program code is run on a computer, the computer is enabled to perform the method in any one of the embodiments.

All or some of the foregoing embodiments may be implemented by using software, hardware, firmware, or any combination thereof. When software is used to implement the embodiments, all or a part of the embodiments may be implemented in a form of a computer program product. The computer program product includes one or more computer instructions. When the computer program instructions are loaded and executed on a computer, procedures or functions according to embodiments of this application are all or partially generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (digital subscriber line, DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a high-density digital video disc (digital video disc, DVD)), a semiconductor medium (for example, a solid state drive (solid-state drive, SSD)), or the like.

The network device in the foregoing apparatus embodiments corresponds to the network device in the method embodiments. A corresponding module or unit performs a corresponding step. For example, a communication unit (a transceiver) performs a receiving step or a sending step in the method embodiments, and a step other than the sending step and the receiving step may be performed by a processing unit (a processor). For a function of a specific unit, refer to a corresponding method embodiment. There may be one or more processors.

Terminologies such as "component", "module", and "system" used in this specification are used to indicate computer-related entities, hardware, firmware, combinations of hardware and software, software, or software being executed. For example, a component may be, but is not limited to, a process that runs on a processor, a processor, an object, an executable file, an execution thread, a program, and/or a computer. As illustrated by using figures, both a computing device and an application that runs on the computing device may be components. One or more components may reside within a process and/or a thread of execution, and a component may be located on one computer and/or distributed between two or more computers. In addition, these components may be executed from various computer-readable media that store various data structures. For example, the components may communicate by using a local and/or remote process and based on, for example, a signal having one or more data packets (for example, data from two components interacting with another component in a local system, a distributed system, and/or across a network such as the Internet interacting with other systems by using the signal).

A person of ordinary skill in the art may be aware that, in combination with illustrative logical blocks (illustrative logical block) described in embodiments disclosed in this specification and steps (step) may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments. Details are not described herein again.

In the several embodiments provided in this application, it should be understood that the disclosed system, apparatus, and method may be implemented in other manners. For example, the described apparatus embodiment is merely an example. For example, division into the units is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, in other words, may be located in one position, or may be distributed on a plurality of network units. Some or all of the units may be selected based on actual requirements to achieve the objectives of the solutions of embodiments.

In addition, functional units in embodiments of this application may be integrated into one processing unit, each of the units may exist alone physically, or two or more units are integrated into one unit.

When functions are implemented in the form of a software functional unit and sold or used as an independent product, the functions may be stored in a computer-readable storage medium. Based on such an understanding, the technical solutions of this application essentially, or the part contributing to the conventional technology, or some of the technical solutions may be implemented in a form of a software product. The computer software product is stored in a storage medium, and includes several instructions for instructing a computer device (which may be a personal computer, a server, a network device or the like) to perform all or some of the steps of the methods described in embodiments of this application. The foregoing storage medium includes any medium that can store program code, such as a USB flash drive, a removable hard disk, a read-only memory (read-only memory, ROM), a random access memory (random access memory, RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A wireless communication apparatus, comprising a communication processor and an application processer, wherein the communication processor is configured to:

receive a first AT command sent by the application processor, wherein the first AT command is used to query a route selection descriptor, and the first AT command comprises a first parameter; and send a first response to the application processor, wherein the first response comprises at least one parameter of at least one route selection descriptor in a target user route selection policy (URSP) rule, wherein the at least one route selection descriptor in the target URSP rule matches with the first parameter; and send a second request to a network device, wherein the second request comprises a request for establishing a session, and the second request comprises the at least one parameter of the route selection descriptor.

2. The wireless communication apparatus according to claim 1, wherein the first parameter is the same as a parameter comprised in a traffic descriptor in the target URSP rule.

3. The wireless communication apparatus according to claim 1, wherein the first parameter comprises at least one of the following parameters:

a destination address parameter of to-be-transmitted data;

a data network parameter corresponding to the to-be-transmitted data;

an application descriptor corresponding to the to-be-transmitted data; or a connection capability parameter corresponding to the to-be-transmitted data.

4. The wireless communication apparatus according to claim 2, wherein the traffic descriptor comprises at least one of the following parameters:

a destination address parameter;

a data network parameter;

an application descriptor; or a connection capability parameter.

5. The wireless communication apparatus according to claim 1, wherein the at least one parameter of the at least one route selection descriptor comprises:

a parameter of a network slice;

a data network name (DNN); or a session type.

6. The wireless communication apparatus according to claim 1, wherein the AT command comprises at least one of the following:

+C5GRSDQRY;    +C5GURSPQRY;    +CURSPQRY; +CQRSD; +C5GQRSD; or +C5GRURSP.

7. The wireless communication apparatus according to claim 1, wherein the first response further comprises a precedence of the route selection descriptor.

8. A communication method, comprising:

receiving, by a communication processor, a first AT command sent by an application processor, wherein the communication processor and the application processor are included in a wireless communication apparatus, the first AT command is used to query a route selection descriptor, and the first AT command comprises a first parameter; and sending, from the communication processor, a first response to the application processor, wherein the first response comprises at least one parameter of at least one route selection descriptor in a target user route selection policy (URSP) rule, wherein the at least one route selection descriptor in the target URSP rule matches with the first parameter; and sending, from the communication processor, a second request to a network device, wherein the second request comprises a request for establishing a session, and the second request comprises the at least one parameter of the route selection descriptor.

9. The method according to claim 8, wherein the first parameter is the same as a parameter comprised in a traffic descriptor in the URSP rule.

10. The method according to claim 8, wherein the first parameter comprises at least one of the following parameters:

a destination address parameter of to-be-transmitted data;

a data network parameter corresponding to the to-be-transmitted data;

an application descriptor corresponding to the to-be-transmitted data; or a connection capability parameter corresponding to the to-be-transmitted data.

11. The method according to claim 9, wherein the traffic descriptor comprises at least one of the following parameters:

a destination address parameter;

a data network parameter;

an application descriptor; or a connection capability parameter.

12. The method according to claim 8, wherein the at least one parameter of the at least one route selection descriptor comprises:

a parameter of a network slice;

a data network name (DNN); or a session type.

13. The method according to claim 8, wherein the first AT command comprises at least one of the following:

+C5GRSDQRY; +C5GURSPQRY; +CURSPQRY; +CQRSD; +C5GQRSD; or +C5GRURSP.

14. The method according to claim 8, wherein the first response further comprises a precedence of the route selection descriptor.

15. A non-transitory computer-readable storage medium, wherein the computer-readable storage medium stores program code, and when the program code is executed by a computer, cause the computer to perform operations comprising:

receiving a first AT command sent by an application processor, wherein the first AT command is used to query a route selection descriptor, and the first AT command comprises a first parameter; and sending a first response to the application processor, wherein the first response comprises at least one parameter of a at least one route selection descriptor in a target user route selection policy (URSP) rule, wherein the at least one route selection descriptor in the target URSP rule matches with the first parameter; and sending a second request to a network device, wherein the second request comprises a request for establishing a session, and the second request comprises the at least one parameter of the route selection descriptor.

16. The computer-readable storage medium according to claim 15, wherein the first parameter is the same as a parameter comprised in a traffic descriptor in the URSP rule.

17. The computer-readable storage medium according to claim 15, wherein the first parameter comprises at least one of the following parameters:

a destination address parameter of to-be-transmitted data;

a data network parameter corresponding to the to-be-transmitted data;

an application descriptor corresponding to the to-be-transmitted data; or a connection capability parameter corresponding to the to-be-transmitted data.

18. The computer-readable storage medium according to claim 16, wherein the traffic descriptor comprises at least one of the following parameters:

a destination address parameter;

a data network parameter;

an application descriptor; or a connection capability parameter.

19. The computer-readable storage medium according to claim 15, wherein the at least one parameter of the at least one route selection descriptor comprises:

a parameter of a network slice;

a data network name (DNN); or a session type.

20. The computer-readable storage medium according to claim 15, wherein the first AT command comprises at least one of the following:

+C5GRSDQRY; +C5GURSPQRY; +CURSPQRY; +CQRSD; +C5GQRSD; or +C5GRURSP.

* * * * *